(12) United States Patent
Tachibana et al.

(10) Patent No.: US 9,768,525 B2
(45) Date of Patent: *Sep. 19, 2017

(54) TERMINAL, METHOD OF MANUFACTURING TERMINAL, AND TERMINATION CONNECTION STRUCTURE OF ELECTRIC WIRE

(71) Applicants: Furukawa Electric Co., Ltd., Tokyo (JP); Furukawa Automotive Systems Inc., Shiga (JP)

(72) Inventors: Akira Tachibana, Tokyo (JP); Kengo Mitose, Tokyo (JP); Saburo Yagi, Tokyo (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 7 days.

This patent is subject to a terminal disclaimer.

(21) Appl. No.: 14/968,464

(22) Filed: Dec. 14, 2015

(65) Prior Publication Data
US 2016/0099507 A1 Apr. 7, 2016

Related U.S. Application Data

(63) Continuation of application No. 14/290,503, filed on May 29, 2014, now Pat. No. 9,246,292, which is a (Continued)

(30) Foreign Application Priority Data

Jul. 27, 2012 (JP) .................. 2012-167779
Feb. 23, 2013 (JP) .................. 2013-034022
Feb. 23, 2013 (JP) .................. 2013-034023

(51) Int. Cl.
*H01R 4/10* (2006.01)
*H01R 4/18* (2006.01)
(Continued)

(52) U.S. Cl.
CPC ............. *H01R 4/183* (2013.01); *B23K 26/21* (2015.10); *B23K 26/32* (2013.01); *H01R 4/184* (2013.01);
(Continued)

(58) Field of Classification Search
CPC .......... H01R 4/185; H01R 4/188; H01R 4/20; H01R 43/048
(Continued)

(56) References Cited

U.S. PATENT DOCUMENTS 4,229,063 A   10/1980 Yoshizawa
4,290,829 A * 9/1981 Koshiishi ................. C21D 9/52
                                                  148/112
(Continued)

FOREIGN PATENT DOCUMENTS

CN   1725559 A   1/2006
CN   101635394 A  1/2010
(Continued)

OTHER PUBLICATIONS

Decision to Grant a Patent received on Dec. 8, 2014 for Japanese Patent Application No. 2013-263805.
(Continued)

*Primary Examiner* — Thanh Tam Le
(74) *Attorney, Agent, or Firm* — Thompson Coburn LLP

(57) ABSTRACT

A terminal includes a tubular crimp portion that crimp connects with an electric wire. The tubular crimp portion is composed of a metal member. The tubular crimp portion includes a non-weld portion and a weld portion, the weld portion being formed by welding. A metal base material
(Continued)

US 9,768,525 B2

Page 2 constituting the metal member of the non-weld portion includes a normal portion and an annealed portion.

14 Claims, 4 Drawing Sheets

Related U.S. Application Data continuation of application No. PCT/JP2013/070523, filed on Jul. 29, 2013.

(51) Int. Cl.
    *H01R 43/048*     (2006.01)
    *H01R 4/20*     (2006.01)
    *H01R 43/02*     (2006.01)
    *B23K 26/32*     (2014.01)
    *B23K 26/21*     (2014.01)
    *H01R 43/16*     (2006.01)
    *C22F 1/08*     (2006.01)
    *B23K 101/38*     (2006.01)
    *B23K 103/10*     (2006.01)
    *B23K 103/12*     (2006.01)

(52) U.S. Cl.
    CPC ............. *H01R 4/187* (2013.01); *H01R 4/20* (2013.01); *H01R 43/02* (2013.01); *H01R 43/0221* (2013.01); *H01R 43/048* (2013.01); *B23K 2201/38* (2013.01); *B23K 2203/10* (2013.01); *B23K 2203/12* (2013.01); *C22F 1/08* (2013.01); *H01R 43/16* (2013.01); *Y10T 29/49213* (2015.01)

(58) Field of Classification Search
    USPC ................... 439/877, 882; 29/863; 174/84 C
    See application file for complete search history.

(56) References Cited

U.S. PATENT DOCUMENTS

| 4,913,718 | A | 4/1990 | Yoshimura et al. |
| 4,966,565 | A | 10/1990 | Dohi |
| 5,025,554 | A | 6/1991 | Dohi |
| 5,356,318 | A | 10/1994 | Fry et al. |
| 5,456,005 | A | 10/1995 | Satoh et al. |
| 5,736,678 | A | 4/1998 | Kobayashi |
| 6,049,046 | A | 4/2000 | Newland |
| 8,106,330 | B2 | 1/2012 | Arao et al. |
| 9,246,292 | B2 * | 1/2016 | Tachibana ............ H01R 43/048 |
| 2004/0137801 | A1 | 7/2004 | Quillet et al. |
| 2007/0184715 | A1 | 8/2007 | Onuma |
| 2010/0018768 | A1 | 1/2010 | Takahashi et al. |
| 2011/0045713 | A1 | 2/2011 | Ono et al. |
| 2011/0056747 | A1 | 3/2011 | Matsushita et al. |
| 2011/0177727 | A1 | 7/2011 | Zhao |
| 2012/0325552 | A1 | 12/2012 | Sakura |
| 2013/0008714 | A1 | 1/2013 | Morikawa et al. |
| 2013/0025935 | A1 | 1/2013 | Takayama et al. |
| 2013/0126055 | A1 | 5/2013 | Sekiya et al. |
| 2014/0273667 | A1 | 9/2014 | Tachibana et al. |

FOREIGN PATENT DOCUMENTS

| CN | 103166066 A | 6/2013 |
| JP | S60-003879 A | 1/1985 |
| JP | H02-103876 | 4/1990 |
| JP | H03101085 A | 4/1991 |
| JP | H06-084547 | 3/1994 |
| JP | H07-036364 U | 4/1995 |
| JP | H07226282 A | 8/1995 |
| JP | 3019822 U | 1/1996 |
| JP | 2001-222243 A | 8/2001 |
| JP | 2003-173854 A | 6/2003 |
| JP | 2004-071437 A | 3/2004 |
| JP | 2004199934 A | 7/2004 |
| JP | 2004207172 A | 7/2004 |
| JP | 2005-174896 A | 6/2005 |
| JP | 2009064579 A | 3/2009 |
| JP | 2010-010013 A | 1/2010 |
| JP | 4598039 B2 | 12/2010 |
| JP | 2011150822 A | 8/2011 |
| JP | 2011210593 A | 10/2011 |
| JP | 2011-222311 A | 11/2011 |
| JP | 2011222243 A | 11/2011 |
| JP | 2012022928 A | 2/2012 |
| JP | 2013-62206 A | 4/2013 |
| JP | 5449632 B1 | 3/2014 |
| WO | 2012011447 A1 | 1/2012 |
| WO | 2014129234 A1 | 8/2014 |

OTHER PUBLICATIONS

Decision to Grant a Patent received on Nov. 25, 2013 for JP2013-547438.
English Translation of International Preliminary Report on Patentability Report (Chapter 1) for PCT/JP2013/070523 dated Jan. 27, 2015.
English Translation of Written Opinion dated Oct. 1, 2013 for PCT/JP2013/070523 and made available Jan. 27, 2015.
Extended European Search Report for European Application No. 13823345.7 dated May 8, 2015.
International Search Report and Written Opinion dated Mar. 25, 2014 of PCT/JP2014/050130.
International Search Report dated Oct. 1, 2013 for PCT/JP2013/070523.
Notice of Allowance dated May 29, 2014 in a corresponding Korean Application No. 10-2014-7012244.
Notice of Reasons for Rejection dated Oct. 14, 2014 for JP2013-263805.
Office Action for CN Application ZL201380002923.4 date Oct. 31, 2014.
Japanese Office Action dated Jan. 23, 2017 in a corresponding Japanese Patent Application No. 2013-263806.

* cited by examiner

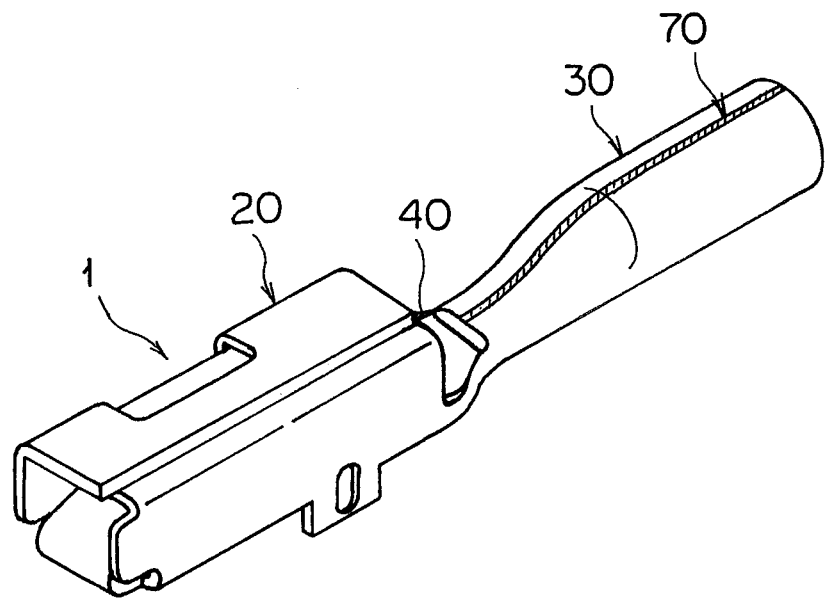
F I G. 1
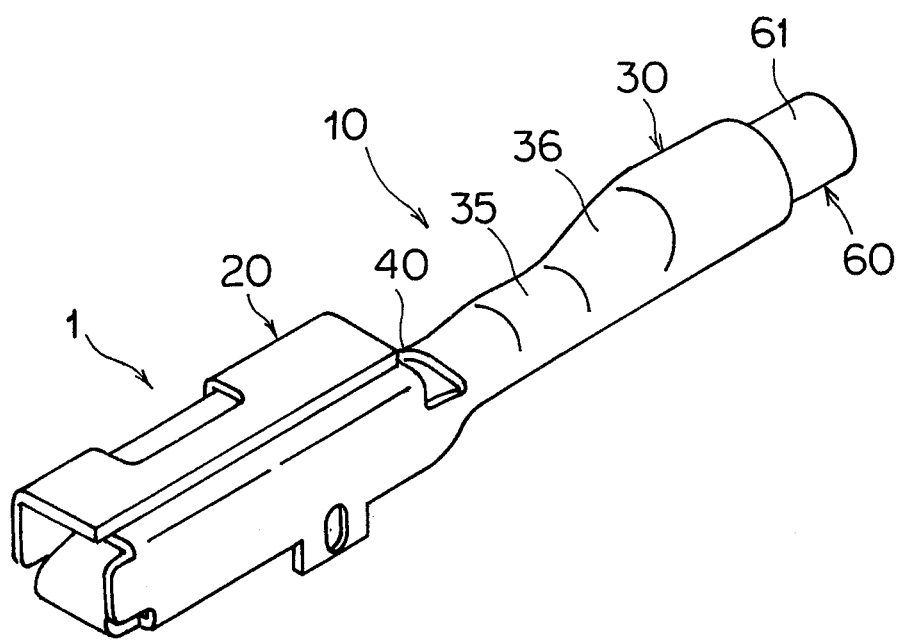
F I G. 2

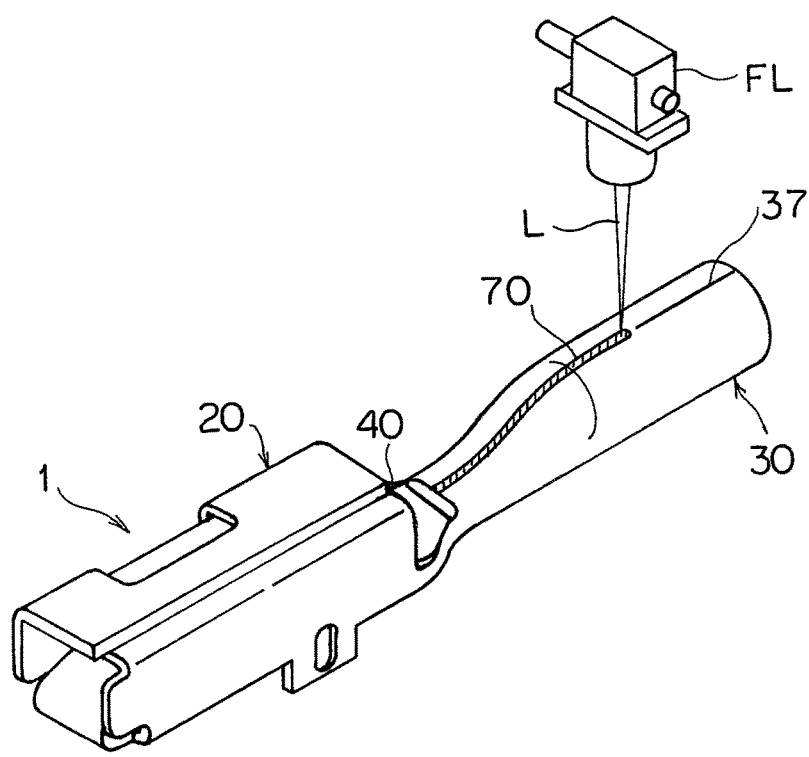
F I G. 3
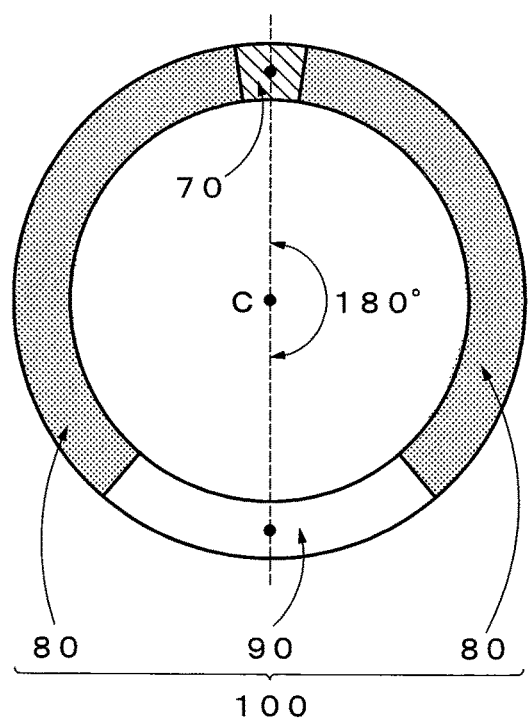
F I G. 4

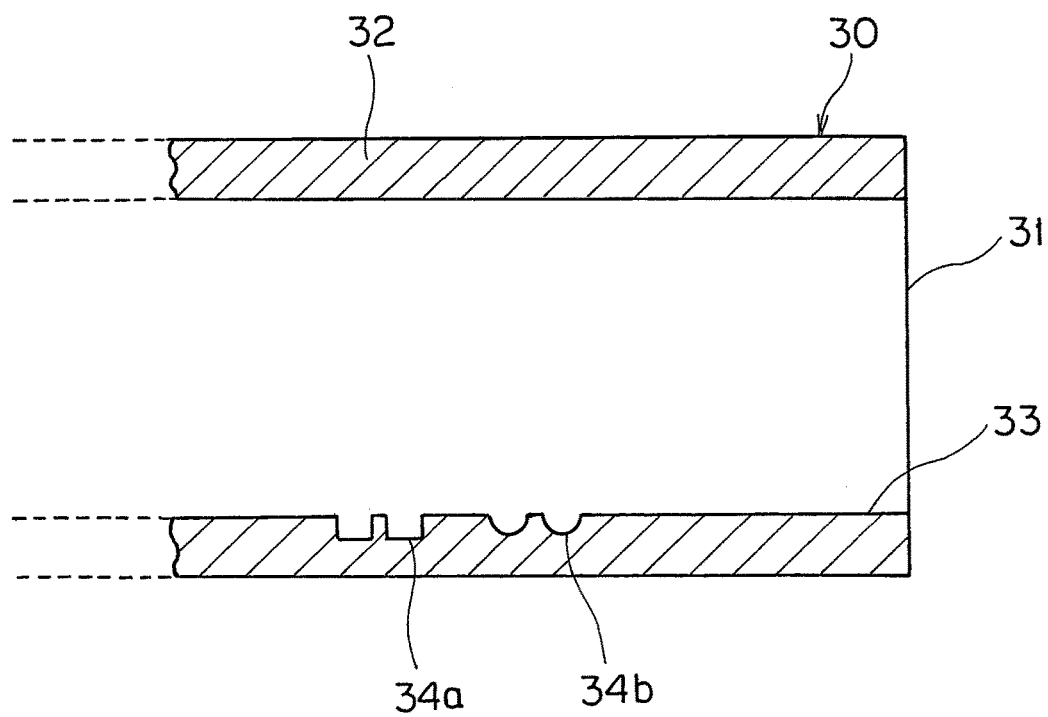
F I G. 5
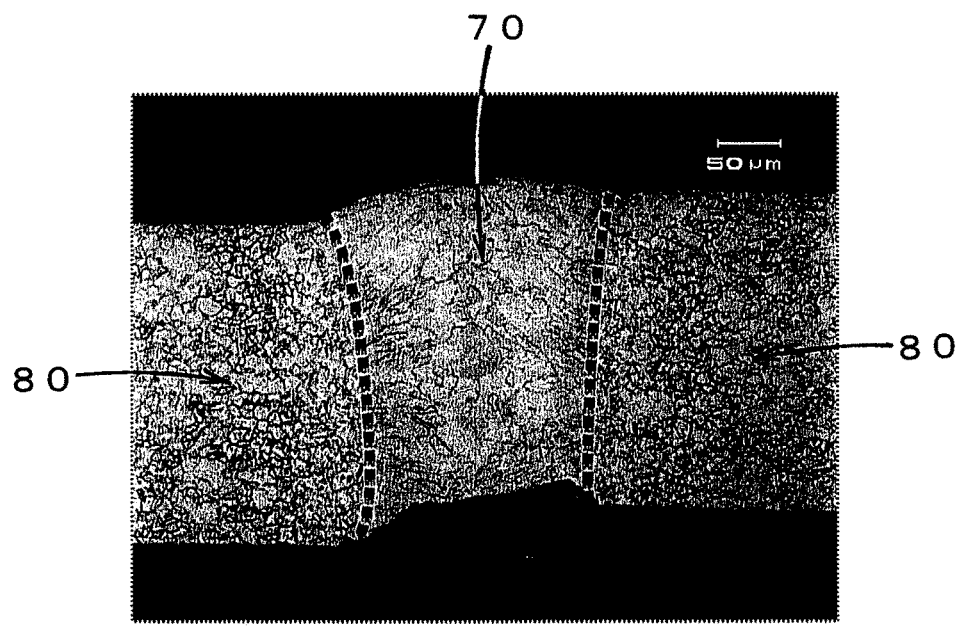
F I G. 6

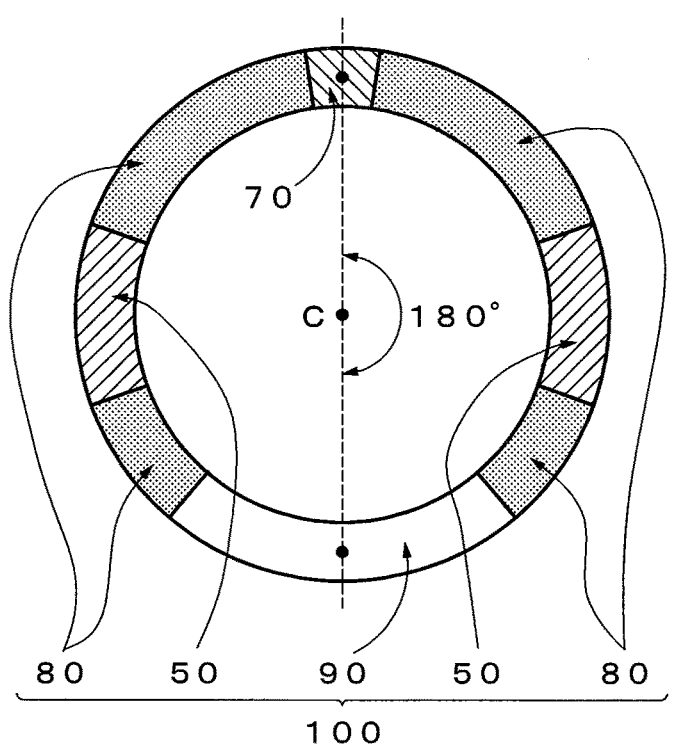
F I G. 7
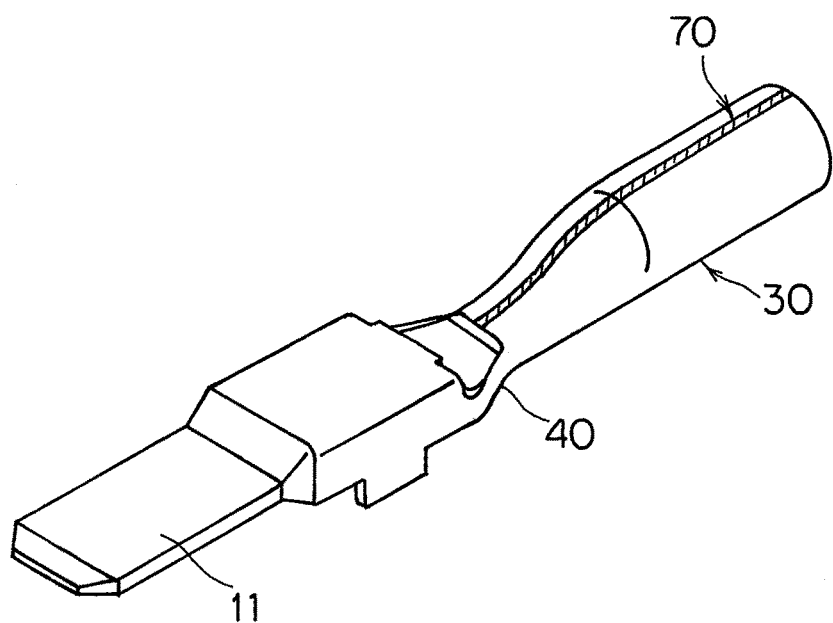
F I G. 8

TERMINAL, METHOD OF MANUFACTURING TERMINAL, AND TERMINATION CONNECTION STRUCTURE OF ELECTRIC WIRE

CROSS REFERENCE TO RELATED APPLICATIONS

This is a continuation application of U.S. application Ser. No. 14/290,503 filed on May 29, 2014, the full contents of which is hereby incorporated by reference in its entirety. U.S. application Ser. No. 14/290,503 is a continuation application of International Patent Application No. PCT/JP2013/070523 filed Jul. 29, 2013, which claims the benefit of Japanese Patent Application Nos. 2012-167779, 2013-034022 and 2013-034023, filed Jul. 27, 2012, Feb. 23, 2013 and Feb. 23, 2013, respectively, the full contents of all of which are hereby incorporated by reference in their entirety.

BACKGROUND

Technical Field

The present disclosure relates to a terminal with a reduced possibility of cracking during crimping and springback after crimping as well as an improved anticorrosion property, a method of manufacturing thereof, and a termination connection structure of an electric wire.

Background Art

In the related art, a connection between an electric wire and a terminal in an automotive wire harness or the like is generally a crimp connection in which an electric wire is crimped with a terminal which is referred to an open barrel type. However, with an open barrel type terminal, when moisture or the like comes into contact with a connecting part (contact point) between the electric wire and the terminal, oxidation of a metal surface of the electric wire and/or the terminal progresses, and an electric resistance at a connecting part will increase. When metals used for the electric wire and the terminal are different from each other, galvanic corrosion progresses. Progression of metal oxidation and corrosion at the connecting part causes a crack and a poor contact at the connecting part, and an influence on a product life cannot be avoided. Particularly, in recent years, wire harnesses having an electric wire made of an aluminum alloy and a terminal base material made of a copper alloy are put to practical use, and thus problems of oxidation and corrosion of the connection part are becoming more prominent.

In order to prevent corrosion of an aluminum wire at the connecting part, Japanese Laid-Open Patent Publication No. 2004-199934 discloses that the terminal is made of an aluminum alloy of the same material type as that of a wire conductor to suppress galvanic corrosion which occurs in the case of a copper terminal of the related art. However, in a case where an aluminum alloy is used for the terminal, strength and spring characteristics of the terminal per se are not sufficient. Further, in order to compensate for the above, a structure incorporating a spring made of an iron-based material in the terminal is employed, and thus there is a problem of galvanic corrosion between a spring member and a terminal base material (aluminum) and a problem of an increased production cost due to time and efforts required for assembling.

Japanese Patent No. 4598039 discloses a configuration in which, in order to protect a connection part between the electric wire and the terminal, a copper cap is attached to a portion of an aluminum wire where a conductor is exposed. However, there is a problem of an increased volume of a crimp portion due to an existence of the cap and a problem of a bad crimp connection and an increased production cost due to an increase in number of parts.

Further, in Japanese Laid-Open Patent Publication No. 2011-222243, a method of molding an entire crimp connection portion with a resin is employed, and there is a problem of an increased size of a connector housing due to an enlarged mold portion, which makes it difficult to make the entire wire harness with a high-density and miniaturized structure, and a problem that a process of manufacturing a wire harness and an operation thereof become more complicated. Japanese Laid-Open Patent Publication No. 2004-207172 discloses employing a method in which, in order to shield an aluminum conductor from outside, a metal cap is provided to cover the wire conductor and thereafter a crimp piece of the terminal is further crimped. However, there is a problem that a process of attaching the aforementioned metal cap to each conductor before crimping the crimp piece of the terminal metal fitting is cumbersome and a problem of an immersion due to breakage of the metal cap by a wire barrel during crimping.

In view of such a situation, how to avoid oxidization or corrosion of a connecting part between an electric wire and a terminal base material and to prevent cracking during crimping and springback after crimping is problematic. Further, how to maintain strength of a connecting part between the electric wire and the terminal and to increase durability and reliability thereof, while preventing the connecting part from having an increased size as well as preventing a complicated connecting process and an increased cost, is problematic. Herein, "springback" is a phenomenon in which a deformed portion tends to return to its original shape. As for the terminal, it is a phenomenon in which a deformed portion of a tubular crimp portion that is crimp connected with the electric wire tends to return to its original shape by an elastic force or the like. When springback occurs in the crimp portion of the terminal, a gap is produced between an inner surface of the tubular crimp portion and the electric wire. This not only causes a contact failure between the electric wire and the terminal but also allows intrusion of moisture into the gap, and may cause corrosion.

SUMMARY

The present disclosure is directed to solving the problems described above, and it is an object of the present disclosure to provide a terminal in which cracking during crimp connecting an electric wire and the terminal and springback after crimp connecting do not occur and having an improved anticorrosion property, a method of manufacturing thereof, and a termination connection structure of an electric wire. Further, it is an object of the present disclosure to provide a terminal in which the size of a connecting part and man-hours and a cost of a connecting process can be reduced, and a manufacturing method thereof.

In order to solve the aforementioned problems, as a basic structure of the terminal of the present disclosure, a structure is employed in which a crimp portion of the terminal is welded to form a tubular crimp portion and an electric wire is inserted into the tubular crimp portion and crimped, and the wire conductor is shielded from outside without enlarging the crimp portion. Also, concerning the processing speed and the cost, it is preferable to employ laser welding for forming the tubular crimp portion of the terminal. As a metal base material constituting a metal member of the terminal, copper or a copper alloy is normally used, but aluminum or an aluminum alloy may be used.

A terminal according to the present disclosure includes a tubular crimp portion that crimp connects with an electric wire, the tubular crimp portion being composed of a metal member, the tubular crimp portion including a non-weld portion and a weld portion, the weld portion being formed by laser welding, wherein a metal base material constituting the metal member of the non-weld portion includes an annealed portion. Further, it is desirable that the annealed portion has a hardness of 70 to 90% of a hardness of the non-weld portion other than the annealed portion. Further, it is preferable that, in a cross section perpendicular to a longitudinal direction of the tubular crimp portion, an area of the annealed portion is 5 to 60% of an area of the weld portion and the non-weld portion.

It is preferable that the terminal according to the present disclosure is configured such that, in a cross section perpendicular to a longitudinal direction of the tubular crimp portion, an area of the weld portion is 2 to 5% of an area of the non-weld portion.

It is preferable that the terminal according to the present disclosure is configured such that a ratio of a hardness of the non-weld portion other than the annealed portion with respect to a hardness of the weld portion is 2.1 to 2.7.

A method of manufacturing a terminal includes forming a crimp portion having a C-shape in a cross section perpendicular to a longitudinal direction of the tubular crimp portion by bending a metal member, and forming the tubular crimp portion by laser welding both ends of the crimp portion, wherein, by the welding, a weld portion is formed in the tubular crimp portion, and an annealed portion are formed in a metal base material constituting the metal member of a non-weld portion. Further, it is preferable that the annealed portion has a hardness of 70 to 90% of a hardness of the non-weld portion other than the annealed portion. Further, it is preferable that a tubular crimp portion is formed by welding such that, in a cross section perpendicular to a longitudinal direction of the tubular crimp portion, an area of the annealed portion is 5 to 60% of an area of the weld portion and the non-weld portion. Note that, the metal base material constituting the metal member may be composed of a plurality of metal base materials, and, in such a case, the plurality of metal base materials may be welded by a suitable welding unit.

With the method of manufacturing a terminal according to the present disclosure, it is preferable that a tubular crimp portion of the terminal is formed by welding such that, in a cross section perpendicular to a longitudinal direction of the tubular crimp portion, an area of the weld portion is 2 to 5% of an area of the non-weld portion.

With the method of manufacturing a terminal according to the present disclosure, it is preferable that the tubular crimp portion of the terminal is formed by welding such that a ratio of the hardness of the non-weld portion other than the annealed portion with respect to the hardness of the weld portion is 2.1 to 2.7.

With the method of manufacturing a terminal according to the present disclosure, considering a process speed and a cost point, it is preferable that laser welding is employed in forming a tubular crimp portion of the terminal. Further, as a metal base material constituting a metal member of the terminal, copper or a copper alloy is normally used, aluminum or an aluminum alloy may be used.

According to a termination connection structure of an electric wire of the present disclosure, a terminal of the present disclosure and an electric wire are crimp connected at the tubular crimp portion of the terminal. Further, the electric wire may be made of one of copper and a copper alloy, and may be one of aluminum and an aluminum alloy, and other metal.

With a basic structure of a terminal of the present disclosure, moisture from outside can be prevented from coming into contact with a contact point between an electric wire and a terminal base material, and it becomes possible to reduce oxidation and corrosion of a metal constituting the electric wire and the terminal. Since the terminal of the present disclosure has an annealed portion, cracking during the crimping and springback after crimping of the tubular crimp portion can be reduced and it becomes possible to increase durability and reliability of the terminal having the tubular crimp portion. A further preferable effect can be achieved when an annealed portion of a terminal of the present disclosure has a hardness of 70 to 90% of a hardness of the normal portion. Also, a preferable effect can be achieved when, in a cross section perpendicular to a longitudinal direction of the tubular crimp portion, an area of the annealed portion is 5 to 60% of an area of the weld portion and the non-weld portion.

With the crimp portion of a terminal of present disclosure being welded in such a manner that a ratio of area of a weld portion with respect to a non-weld portion is within a predetermined range, it becomes possible to prevent cracking in a tubular crimp portion during crimping and to improve durability and reliability of a terminal having a tubular crimp portion. Further, with the crimp portion of a terminal of present disclosure being welded in such a manner that a ratio of a hardness of the normal portion with respect to a hardness of the weld portion is within a predetermined range, it becomes possible to prevent cracking in a tubular crimp portion and to improve durability and reliability of the terminal having the tubular crimp portion. Further, by employing the terminal of the present disclosure, a size and cost of a connecting part can be reduced. Note that, as described below, hardness may be expressed by units such as Vickers hardness or any other suitable units.

With the method of manufacturing the terminal of the present disclosure, since the terminal forms an annealed portion, cracking during crimping and springback after crimping of the tubular crimp portion can be prevented and it becomes possible to increase durability and reliability of the terminal having the tubular crimp portion. A further preferable effect is obtained by having a hardness of 70 to 90% of a hardness of the normal portion, and a further preferable effect is obtained by performing the welding in such a manner that, in a cross section which is perpendicular to a longitudinal direction of the tubular crimp portion, an area of the annealed portion of the metal base material is 5 to 60% of an area of the weld portion and the non-weld portion. Further, with the method of manufacturing the terminal of the present disclosure, an annealing process can be performed simultaneously with the formation of the tubular crimp portion by welding and the formation of the annealed portion of the tubular crimp portion can be performed in a single step, thus resulting in a reduction of the production cost.

With a method of manufacturing the terminal of the present disclosure, since welding is performed in such a manner that an area ratio of the weld portion to the non-weld portion is within a predetermined range when forming the tubular crimp portion by welding, cracking of the terminal during crimping can be prevented and it becomes possible to improve durability and reliability of the terminal. Further, with a method of manufacturing the terminal of the present disclosure, since welding is performed in such a manner that a ratio of the hardness of the normal portion to the hardness of the weld portion is within a predetermined range when forming the tubular crimp portion by welding, cracking of the terminal during crimping can be prevented and it becomes possible to improve durability and reliability of the terminal. Also, with a method of manufacturing the terminal of the present disclosure, the connecting process can be prevented from becoming complicated or having an increased cost.

Further, with the termination connection structure of the electric wire of the present disclosure, the tubular crimp portion can prevent moisture from outside from coming into contact with a contact point between the electric wire and the metal base material in a state where the electric wire and the terminal are in contact by crimping, and oxidation and galvanic corrosion of the metals constituting the electric wire and the terminal can be prevented. Since the terminal of the present disclosure can prevent cracking during crimping and springback after crimping of the tubular crimp portion, a wire harness having anticorrosion property and reliability can be provided by using a termination connection structure of the electric wire of the present disclosure and assembling the wires.

BRIEF DESCRIPTION OF DRAWINGS

FIG. 1 is a perspective view showing an embodiment of a terminal of the present disclosure.

FIG. 2 is a perspective view showing a termination connection structure of an electric wire of the present disclosure.

FIG. 3 is a perspective view schematically showing a state during the manufacture of the terminal of the present disclosure.

FIG. 4 is a cross-sectional view showing a cross section perpendicular to a longitudinal direction of a tubular crimp portion of the terminal of the present disclosure.

FIG. 5 is a cross-sectional view showing a cross section parallel to the longitudinal direction of the tubular crimp portion of the terminal of the present disclosure.

FIG. 6 is an image of a cross section perpendicular to the longitudinal direction of the tubular crimp portion of the terminal of the present disclosure.

FIG. 7 is a cross-sectional view showing a cross section perpendicular to the longitudinal direction of the tubular crimp portion of the terminal of the present disclosure.

FIG. 8 is a perspective view showing another embodiment of the terminal of the present disclosure.

DETAILED DESCRIPTION

Embodiments of the present disclosure will be described with reference to the drawings. The embodiment described below is an example, and the scope of the invention is not limited to the embodiment and may also encompass other embodiments.

FIG. 1 shows an example of a basic configuration of a terminal 1 of the present disclosure. The terminal 1 has a connector portion 20 and a tubular crimp portion 30, as well as a transition portion 40 that bridges them. Further, since the tubular crimp portion 30 of the terminal 1 is formed by welding, a weld portion 70 (in FIG. 1, a hatched portion) is formed in the tubular crimp portion. The terminal 1 is fabricated from a metal member to ensure conductivity and strength. The metal member includes a base material made of a metal material (copper, aluminum, iron or alloys containing them as main components) and a plating portion optionally provided on a surface thereof. The plating portion may be provided on all or a part of the metal base material and a noble metal plating such as a tin plating or a silver plating is preferable. The plating portion may be further provided with an undercoating such as iron (Fe), nickel (Ni) and cobalt (Co), and alloys having such elements as main components. In consideration of the protection and the cost of the metal base material, the plating portion has a plating thickness of normally 0.3 micrometers (μm) to 1.2 micrometers (μm). An electric wire 60 includes an insulating coating 61 and a metal core wire (not shown). The electric wire 60 may be a bare wire, but an insulated coated wire is normally used as a wire harness. When manufacturing a termination connection structure 10 of the electric wire, the tubular crimp portion 30 of the terminal 1 and the electric wire 60 are crimped with a special jig, a pressing machine, or the like. At this time, an entirety of the tubular crimp portion 30 may be reduced in its diameter, and the tubular crimp portion may be crimped by being partly pressed strongly into a recessed shape.

The connector portion 20 is a box portion that permits, for example, insertion of an insertion tab of a male terminal or the like. In the present disclosure, a shape of a detailed portion of such a box portion is not particularly limited. For example, as shown in FIG. 8, another embodiment of the terminal of the present disclosure may be a structure having an insertion tab 11 of a male terminal. In the present embodiment, an example of a female terminal is shown for the sake of convenience of describing the terminal of the present disclosure.

The tubular crimp portion 30 is a portion that crimp connects the terminal 1 and an electric wire. One end thereof has an insertion opening 31 through which an electric wire can be inserted, and another end thereof is connected to the transition portion 40. In order to prevent intrusion of moisture or the like, it is preferable that a transition portion 40 side of the tubular crimp portion 30 has a closed end. A method of closing an end may be, for example, laser welding and press molding. However, when an end on the transition portion side is closed, a border between the tubular crimp portion 30 and the transition portion 40 becomes particularly ambiguous. Accordingly, in the present application, a portion from a part at which a core wire and a terminal base material are crimped to an insertion opening is referred to as the tubular crimp portion. The tubular crimp portion of the terminal of the present disclosure can achieve a certain effect against corrosion as long as it is tubular, and thus its shape and size may vary along its longitudinal direction.

As the core wire of the electric wire, copper alloy wires, aluminum alloy wires and the like are put into practical use. As an example of the aluminum alloy core wire, an aluminum core wire consisting of approximately 0.2 mass % iron (Fe), approximately 0.2 mass % copper (Cu), approximately 0.1 mass % magnesium (Mg), approximately 0.04 mass % silicon (Si), and a balance consisting of aluminum (Al) and incidental impurities, can be used. Other alloy compositions which may be used are an alloy composition consisting of approximately 1.05 mass % Fe, approximately 0.15 mass % Mg, approximately 0.04 mass % Si, and a balance consisting of Al and incidental impurities, an alloy composition consisting of approximately 1.0 mass % Fe, approximately 0.04 mass % Si, and a balance consisting of Al and incidental impurities, and an alloy composition consisting of approximately 0.2 mass % Fe, approximately 0.7 mass % Mg, approximately 0.7 mass % Si, and a balance consisting of Al and incidental impurities. These may further contain alloy elements such as Ti, Zr, Sn, and Mn. Using a metal core wire of such a composition, a core wire having a total cross section of 0.5 to 2.5 sq (mm²) with 7 to 19 twisted core wires can be employed. As a coating material of the core wire, for example, those having polyolefin such as PE and PP as a main component, those having PVC as a main component, or the like, may be used.

At the tubular crimp portion 30, the metal member constituting the tubular crimp portion and the electric wire are crimp connected to thereby realize a mechanical connection and an electrical connection. The tubular crimp portion 30 needs to be designed to have a certain wall thickness to enable crimp connection. FIG. 2 shows a termination connection structure 10 of the electric wire of the present disclosure. The termination connection structure 10 has a structure in which the terminal 1 of the present disclosure and the electric wire 60 are connected. In the termination connection structure 10, the terminal 1 and the electric wire 60 are crimp connected with the tubular crimp portion 30. By bundling a plurality of such connection structures, it is possible to obtain, for example, an automotive wire harness.

FIG. 3 is a diagram schematically showing a state during the manufacture of the terminal 1 of the present disclosure. FL in FIG. 3 represents a fiber laser welding apparatus. Fiber laser light L emitted from the welding apparatus FL is irradiated to weld an un-weld portion 37 of the metal member constituting the tubular crimp portion 30. As described below, in a metal member constituting the tubular crimp portion 30, the weld portion 70 is formed by welding, and in the metal base material on both sides thereof, an annealed portion 80 is formed due to an influence of heat during the welding. The annealed portion 80 is a portion that has a structure which is softer than the terminal base material. The annealed portion also includes a so-called HAZ (Heat Affected Zone). In the metal base material of the tubular crimp portion 30, a portion other than the weld portion 70 and the annealed portion 80, that is to say, the non-weld portion 100 other than the annealed portion 80 is referred to as a normal portion 90. As opposed to the weld portion 70 of the metal member, a portion constituted by the normal portion 90 and the annealed portion 80 as well as a plating portion optionally provided on surfaces thereof is referred to as a non-weld portion 100 of the metal member. FIG. 1 mentioned above shows the terminal 1 of the present disclosure after the welding using the fiber laser welding apparatus has been completed. During the laser welding, the weld portion 70 shown in FIG. 1 can be formed as, for example, a generally linear region from the transition portion 40 to the insertion opening 31 of the electric wire. The weld portion 70 is formed by the metal member (the base material and the plating portion) which is once melted by heat from the laser and thereafter solidified. Usually, a size of a crystal grain thereof is larger than that of the non-weld portion 100. The plating metal that was constituting the plating portion may melt into the weld portion 70. Note that, the welding by the aforementioned fiber laser welding apparatus is described as an example of the welding method and may be other welding method as long as it does not depart from the present disclosure.

As shown in FIG. 7, a portion having a hardness of 70 to 90% of the hardness of the normal portion 90 is formed in the annealed portion 80 of the metal base material of the non-weld portion 100 and such a portion is referred to as an annealed portion 50 of the metal base material (hereinafter, such a portion of the annealed portion 80 is referred to as an annealed portion 50). When crimp connecting the electric wire 60 and the tubular crimp portion 30, the annealed portion 80 of the metal base material exerts a buffer effect to the deformation of the terminal 1. Normally, the base material constituting the terminal 1 has characteristics which remain the same as the characteristics of the material itself at the time of manufacture, and it is also work-hardened due to further working by terminal shaping or the like. The annealed portion 80 of the metal base material can be transformed with a stress lower than a stress in the normal portion, since it has a softened structure obtained by reducing an internal strain from such a worked structure. Also, an amount that can deform plastically is greater than that of the normal portion. In other words, when crimp connecting the electric wire, since the annealed portion 80 has a buffer effect on a stress in the terminal base material, deformation into a desired shape is facilitated and a good workability is obtained.

Note that, the annealed portion 80 (the annealed portion 50) does not necessarily have to be provided over an entirety of the tubular crimp portion 30. This is because with the existence of the annealed portion, workability becomes good and an effect of reducing the springback is obtained. Therefore, the annealed portion may be provided only at a part of the tubular crimp portion 30. Preferably, it is provided in the vicinity of a connecting part between the core wire and the tubular crimp portion of the wire that is a part where an amount of working is the greatest. The annealed portions are preferably provided substantially symmetrical about the weld portion in a cross section perpendicular to the longitudinal direction.

Although it depends on the kind of metal base material constituting the metal member of the terminal 1, in a case where the base material is made of a copper alloy or an aluminum alloy, the annealed portion 80 can be provided by increasing the temperature to 500° C. or above. Specifically, if it is possible to apply a heat treatment such that the temperature of a predetermined region of the tubular crimp portion 30 can be increased to 500° C. or above and maintained for a predetermined time, as necessary, the annealed portion 80 is formed. The settings of the temperature and the maintaining time are determined such that a predetermined hardness of the annealed portion 50 is obtained. It is necessary to perform heat treatment under a condition that the annealed portion 80 has a predetermined area ratio with respect to the tubular crimp portion in a cross sectional view perpendicular to the longitudinal direction of the tubular crimp portion 30. The temperature range for providing an annealed portion may be a temperature range below and above 500° C. within which the shape and the function as a terminal are not lost.

FIG. 7 is a cross-sectional view perpendicular to the longitudinal direction of the tubular crimp portion 30. In a cross section perpendicular to the longitudinal direction of the tubular crimp portion 30 of the terminal 1 of the present disclosure, the annealed portion 50 (hatched portion) is formed that has a hardness of 70 to 90% of the hardness of the normal portion 90 of the metal base material constituting a metal member 32. Such an annealed portion 50 is formed in the annealed portion 80 of the non-weld portion 100. The formation of this annealed portion may be performed by separately performing an annealing process in addition to laser welding for forming the tubular crimp portion. In the tubular crimp portion 30 of the terminal 1 of the present disclosure, as shown in FIG. 7, an area of the region of this annealed portion 50 has an area of 5 to 60% of the area of the weld portion 70 and the non-weld portion 100 in the cross section perpendicular to the longitudinal direction. It was seen that, when the annealed portion 50 takes such a value of the area ratio, cracking during crimping and an amount of springback after crimping of the tubular crimp portion 30 decrease as described below. Note that the area ratio of the annealed portion in a cross sectional view is a value obtained by dividing a cross sectional area of the region of the annealed portion 50 of the metal base material by a total cross sectional area of the tubular crimp portion 30. For example, in a case where the tubular crimp portion 30 is a circular cylinder, the area ratio is 100×((length of annealed portion)×thickness of board)/(circumference of tube×thickness of board). Here, the circumference of the tube is (outer circumference of tube+inner circumference of tube)/2. Note that, C in FIG. 7 indicates a center of the tube when the tubular crimp portion 30 is viewed in a cross section perpendicular to the longitudinal direction.

In order to calculate the area ratio from the cross section of the tubular crimp portion, it is necessary to determine the region of the annealed portion. However, it is difficult to distinguish between the work structure and the annealed portion at a glance. When it can be distinguished, an area ratio can be calculated with the aforementioned method. However, when it cannot be distinguished, an area ratio can be calculated by measuring the hardness along an entire circumference at a predetermined interval for the metal base material portion in the cross section of the tubular crimp portion. In this case, a hardness of at least ten points or more is measured, and the number of points at which the hardness is 70 to 90% when the hardness of the metal base material is taken as 100% is counted. That is to say, in this case, the area ratio of the annealed portion can be obtained by (number of points at which the hardness is 70 to 90% of the hardness of the metal base material)/(number of points at which measurement was performed). Note that, the hardness may be measured using hardness tests of Rockwell hardness (HR), Vickers hardness (Hv), Knoop hardness (HN), the Brinell hardness (HB), or the like. Herein, a method of measuring a hardness with a Vickers hardness test is taken as an example. Measurement of the hardness is preferably performed by a method in conformity with a normal industry standard (JIS Z2244 for Vickers test) or the like.

FIG. 4 is a cross-sectional view perpendicular to a longitudinal direction of the tubular crimp portion 30. The cross section of the tubular crimp portion 30 of the terminal 1 of the present disclosure is constituted by the metal member 32 having a predetermined wall thickness, and, as has been described above, this can be divided into the normal portion 90 of the metal base material and the annealed portion 80 of the metal base material which are the non-weld portion 100, as well as the weld portion 70, and further the plating portion (not shown) which is optionally provided on a surface of the base material. It is desirable that, when it is viewed in a cross section perpendicular to the longitudinal direction of the tubular crimp portion 30 shown in FIG. 2, welding (e.g., laser welding) is performed in such a manner that the region of the weld portion 70 has an area ratio of 2 to 5% of the region of the non-weld portion 100 (the normal portion 90 and the annealed portion 80, as well as the plating portion optionally provided on the surface of metal base material thereof). This is because test results obtained showed that cracking in the tubular crimp portion 30 during crimping can be prevented when the region of the weld portion 70 takes such a value of the area ratio with respect to the region of the non-weld portion 100 (see test results and evaluation results described below). More desirably, the region of the weld portion 70 formed by welding has an area ratio of 2.5 to 3.5% of the region of the non-weld portion 100 (the normal portion 90 and the annealed portion 80, as well as the plating portion optionally provided on a surface of these metal base material). Even more desirably, the region of the weld portion 70 formed by welding has an area ratio of approximately 3% of the region of the non-weld portion 100 (the normal portion 90 and the annealed portion 80, as well as the plating portion optionally provided on a surface of these metal base material). Note that, these can be performed with or without the formation of the annealed portion having the aforementioned predetermined area ratio.

Note that, the area ratio of the weld portion 70 of the tubular crimp portion 30 when viewed in a cross section is obtained by dividing a cross sectional area of the region of the weld portion 70 by that of the region of the non-weld portion 100. For example, in a case where the tubular crimp portion 30 is a circular cylinder, the area ratio is 100× ((length of weld portion 70×board thickness)/((circumference of tube of tubular crimp portion 30×board thickness)−(length of weld portion 70×board thickness))). Here, as for the circumference of the tube of the tubular crimp portion 30, the circumference is (outer circumference of tube+inner circumference of tube)/2. Note that, C in FIG. 4 shows a center when the tubular crimp portion 30 is viewed in a cross section perpendicular to the longitudinal direction.

In order to calculate an area ratio from the cross section of the tubular crimp portion 30, it is necessary to discriminate between the region of the weld portion 70 and the region of the non-weld portion 100. The discrimination can be performed by, for example, observing an SEM (Scanning Electron Microscope) image of the cross section of the tubular crimp portion 30 and identifying the weld portion 70 and the non-weld portion 100. In that case, discrimination is made possible by etching the cross section of the tubular crimp portion 30. An example thereof is shown in FIG. 6. FIG. 6 is a cross sectional photographic image showing a state in which the weld portion 70 and the annealed portion 80 are respectively formed in the tubular crimp portion 30 after the welding. By using such a photographic image, each portion can be identified. As another discrimination method, a method of discriminating the weld portion and the non-weld portion by measuring the hardness along an entire circumference at a predetermined interval for the metal base material portion of the cross section of the tubular crimp portion 30 and calculating the area ratio is conceivable. In this case, for example, a method is employed in which at least ten points or more are measured, and the weld portion 70 and the non-weld portion 100 are discriminated using the value of hardness. As has been described above, the hardness may be measured using hardness tests such as Rockwell hardness (HR), Vickers hardness (Hv), Knoop hardness (HN), the Brinell hardness (HB).

It is desirable that in a cross section perpendicular to the predetermined longitudinal direction of the tubular crimp portion 30 shown in FIG. 2, laser welding is performed in such a manner that the ratio of the hardness of the region of the normal portion 90 with respect to the hardness of the region of the weld portion 70 is 2.1 to 2.7. This is because the test results obtained showed that cracking in the tubular crimp portion 30 during crimping can be prevented when the ratio of hardness of the region of the normal portion with respect to the hardness of the region of the weld portion 70 takes such a range of values (see test results and evaluation results described below). More desirably, it is a case where the ratio of the hardness of the region of the normal portion 90 with respect to the hardness of the region of the weld portion 70 formed by welding is 2.2 to 2.5. Even more desirably, it is a case where the ratio of the hardness of the region of the normal portion 90 of the non-weld portion 100 with respect to the hardness of the region of the weld portion 70 formed by welding is 2.3 to 2.4. These can be performed whether the annealed portion having an aforementioned predetermined area ratio is formed or not.

With reference to FIG. 4, viewing in a cross section perpendicular to the longitudinal direction of the tubular crimp portion 30, for the sake of convenience, the hardness of the weld portion 70 is a hardness at a center position of the weld portion 70 (a center point of the weld portion 30 on a broken line passing through the weld portion 30 in FIG. 4), and the hardness of the normal portion 90 is a hardness at a position of the normal portion 90 which is at approximately 180 degrees in a peripheral direction from the center position of the weld portion 70 (e.g., a center point of the normal portion on a broken line passing through the normal portion in FIG. 4). The measuring point of the hardness may be other position in the weld portion 70 and the normal portion 90. C in FIG. 4 shows the center when the tubular crimp portion 30 is viewed in a cross section perpendicular to the longitudinal direction.

As has been described above, discrimination between the region of the weld portion 70 and the region of the non-weld portion 100 of the tubular crimp portion 30 is performed by, for example, observing an SEM (Scanning Electron Microscope) image of the cross section of the tubular crimp portion 30 and identifying the weld portion 70 and the non-weld portion 100. In that case, discrimination is made possible by etching the cross section of the tubular crimp portion 30. An example thereof is shown in FIG. 6. FIG. 6 shows a state in which the weld portion 70 and the annealed portion 80 are respectively formed in the tubular crimp portion 30 after the welding. By using such an image, each portion can be identified. As another discrimination method, a method of discriminating the weld portion and the non-weld portion by measuring the hardness along an entire circumference at a predetermined interval for the metal base material portion of the cross section of the tubular crimp portion 30 and calculating the area ratio is conceivable. In this case, for example, a method in which a hardness of at least ten points or more is measured and the weld portion 70 and the non-weld portion 100 are discriminated using the value of hardness is conceivable.

Hereinafter, a manufacturing method of the terminal 1 of the present disclosure will be described. Since the terminal 1 of the present disclosure is a terminal that has the tubular crimp portion 30 and has the annealed portion in the tubular crimp portion 30, the manufacturing method is not limited as long as such a configuration can be achieved.

For the manufacturing of the terminal 1 of the present disclosure, a metal member is used which is optionally provided with a plating portion on a surface of a metal base material (a copper alloy, an aluminum alloy and an iron alloy). A strip (board) of such a metal member is punched into a shape of a terminal unfolded into a planar development and a crimp portion is provided by bending. At this time, the crimp portion generally has a C-shaped cross section due to the bending from a flat plane, and becomes a tubular crimp portion by joining an open part by welding. As a preferred manufacturing method of the terminal 1 of the present disclosure, the tubular crimp portion 30 is laser welded by a fiber laser.

Since copper and a copper alloy have bad absorption efficiency for heat produced by laser light irradiation, the weld portion and the annealed portion might not be provided suitably when these are used as the metal base material. This problem is overcome by using a laser light having a high energy density such as a fiber laser light. With the welding by the fiber laser light having a high energy density, the annealed portion 80 can be provided in the metal base material while forming the tubular crimp portion 30. Thus, since the tubular crimp portion 30 and the annealed portion 80 can be provided in one step, the terminal 1 of the present disclosure can be manufactured efficiently. This is similar for the annealed portion 50.

In the terminal 1 of the present disclosure, the tubular crimp portion 30 may be formed with a different welding unit. In such a case, since the annealed portion 80, 50 may not be formed suitably, it is necessary to apply partial heat treatment and cooling to the tubular crimp portion 30 in such a case.

FIG. 3 is a view schematically showing a state during manufacturing of the terminal 1 of the present disclosure. FL in FIG. 3 represents a fiber laser welding apparatus. Fiber laser light L emitted from the welding apparatus FL is irradiated to weld an un-weld portion 37 of the metal member constituting the tubular crimp portion 30. With the heat due to the welding, an annealed portion 80 is formed in the metal base material constituting the tubular crimp portion 30. The annealed portion 80 can be provided by a heat treatment of 500° C. or above. However, if the fiber laser light L having an excessively high energy density is used, the annealed portion is formed in a broader extent than necessary and the entire tubular crimp portion 30 softens. Therefore, it is preferable that the welding is performed with the fiber laser light L having an output power of 150 to 500 W. The annealed portion 80 can be provided in an appropriate extent by adjusting a laser power and a sweep rate.

The manufacturing method of the terminal 1 of the present disclosure is a method of manufacturing a terminal in which, when forming the tubular crimp portion 30 by welding (e.g., laser welding), in addition to or alternatively to the above, welding is performed in such a manner that the weld portion 70 of a predetermined size is formed in the tubular crimp portion 30 (see FIG. 1). Also, manufacturing method of the terminal 1 of the present disclosure is a method of manufacturing a terminal in which, when forming the tubular crimp portion 30 by welding, in addition to or alternatively to the above, welding is performed in such a manner that the weld portion 70 having a predetermined hardness is formed in the tubular crimp portion 30 (see FIG. 1). As a method of forming the tubular crimp portion 30, laser welding or other welding method is conceivable.

The manufacturing method of the terminal 1 of the present disclosure is a method in which, when forming the tubular crimp portion of the metal member by forming a crimp portion having a C-shaped cross section by bending the aforementioned metal member and then welding the crimp portion at opposing ends thereof, the tubular crimp portion 30 is formed by welding in such a manner that the region of the weld portion 70 has an area ratio of 2 to 5% of the region of the non-weld portion 100 (the normal portion 90 and the annealed portion 80, and the plating portion optionally provided on the surface of the metal base material thereof) when viewed in a cross section perpendicular to the longitudinal direction of the tubular crimp portion 30. As has been described above, this is because the test result showed that cracking during crimping of the tubular crimp portion 30 can be prevented when the region of the weld portion 70 takes such a value of area ratio with respect to the region of the non-weld portion 100.

The manufacturing method of the terminal 1 of the present disclosure is, more desirably, a method in which the tubular crimp portion 30 is formed by welding in such a manner that the region of the weld portion 70 has an area ratio of 2.5 to 3.5% of the region of the non-weld portion 100 (the normal portion 90 and the annealed portion 80, and the plating portion optionally provided on the surface of the metal base material thereof). Even more desirably, it is a method in which the tubular crimp portion 30 is formed by welding in such a manner that the region of the weld portion 70 has an area ratio of approximately 3% of the region of the non-weld portion 100 (the normal portion 90 and the annealed portion 80, and the plating portion optionally provided on the surface of the metal base material thereof).

Also, according to the manufacturing method of the terminal 1 of the present disclosure, in forming the tubular crimp portion of the terminal, when forming the tubular crimp portion 30 of the metal member by forming a crimp portion having a C-shaped cross section by bending the aforementioned metal member and then welding the crimp portion at opposing ends thereof, the weld portion 70 formed by welding and the non-weld portion 100 including the normal portion 90 of the metal base material, the annealed portion 80 of the metal base material, and the plating portion optionally provided on the surface of the metal base material thereof are formed in the tubular crimp portion 30, and the method is characterized in that the tubular crimp portion 30 of the terminal 1 is formed by welding in such a manner that the ratio of the hardness of the normal portion 90 of the metal base material with respect to the hardness of the weld portion 70 is 2.1 to 2.7.

The manufacturing method of the terminal 1 of the present disclosure is more preferable when the tubular crimp portion 30 of the terminal 1 is formed by welding in such a manner that ratio of the hardness of the normal portion 90 with respect to the hardness of the weld portion 70 is 2.2 to 2.5. More preferably, it is a manufacturing method of the terminal in which the tubular crimp portion 30 is formed by welding in such a manner that a ratio of the hardness of the normal portion 90 with respect to the hardness of the weld portion 70 is 2.3 to 2.4. As has been described above, for the sake of convenience, the hardness of the weld portion 70 is the hardness at the center position of the weld portion 70, and the hardness of the normal portion 90 is the hardness at either position of the positions of approximately 180 degrees in a peripheral direction from the center position of the weld portion 70 of the normal portion 90 when the tubular crimp portion 30 is viewed in a cross section perpendicular to the longitudinal direction. The measuring point of the hardness may be other positions in the weld portion 70 and the normal portion 90.

The manufacturing method of the terminal 1 of the present disclosure is preferably a method of manufacturing the tubular crimp portion 30 by laser welding by a fiber laser. By using a laser light that has a high energy density such as a fiber laser light, even with copper or a copper alloy having bad absorption efficiency for heat produced by laser light irradiation, a weld width and a width of the heat affected zone can be made smaller. When providing a wire engaging groove in the tubular crimp portion 30, the groove can be provided by partially melting an inner part of the crimp portion before the laser welding using a fiber laser.

FIG. 5 shows a part of a cross-sectional view parallel to the longitudinal direction of the tubular crimp portion 30. FIG. 5 shows a configuration provided with wire engaging grooves 34a and 34b in an inner wall surface 33 of the tubular crimp portion 30. A plating such as tin or silver is usually applied at a part where the core wire of the electric wire and the metal member come into contact. Particularly, when the electric wire made of a core wire of aluminum or an aluminum alloy is used, since aluminum or an aluminum alloy has a greater contact resistance against tin as compared to copper or a copper alloy, a contact pressure can be maintained well and it becomes possible to improve electric performance by providing the wire engaging grooves 34a and 34b in the tubular crimp portion 30. In FIG. 5, the wire engaging groove 34a is formed as a groove having a rectangular cross section, and the wire engaging groove 34b is formed as a groove having a semicircular cross section. These wire engaging grooves can be formed by processing the metal member before forming the tubular crimp portion 30. Also, these wire engaging grooves can be provided by cutting or the like by a fiber laser and a machine. Such grooves are also referred to as serrations, and can be formed in an inner wall surface 33 of the metal member of the tubular crimp portion 30 as necessary.

FIG. 2 shows the termination connection structure 10 of the electric wire of the present disclosure. The termination connection structure 10 has a structure in which the terminal 1 of the present disclosure and an electric wire (electric wire 60) are connected. As for the termination connection structure 10, the terminal 1 and the electric wire 60 are crimp connected by the tubular crimp portion 30. A manner in which the crimp connection is not particularly limited, but in FIG. 2, a first crimp deformation portion 35 and a second crimp deformation portion 36 are provided. Usually, when an electric wire and a terminal base material are worked for crimp connection, the tubular crimp portion 30 is plastically deformed and crimp connected with the electric wire 60. In the example shown in FIG. 2, the first crimp deformation portion 35 is the portion where an amount of deformation is the greatest. In this manner, crimp connection may be performed in two steps of deformation. Note that, the processing may be not only a deformation process such as diameter reduction, but may also be deformation of the tubular crimp portion into an irregular shape.

When manufacturing the termination connection structure 10 of the electric wire, crimp connection that positively causes plastic deformation of the annealed portion 80, 50 of the metal base material of the tubular crimp portion 30 is preferable. When crimp connecting the tubular crimp portion 30 of the terminal 1 and the electric wire 60, it is performed with an exclusive jig or a press machine. In such a case, crimping may be performed by diameter reduction on the entire tubular crimp portion 30 and there may also be a case in which the tubular crimp portion is crimped by partially performing a strong working into a recessed shape. In such a case, a position is preferably adjusted in such a manner that an amount of plastic deformation of the annealed portion 80, 50 becomes greater. In other words, by adjusting a tip of a protruded portion formed during press machining to come directly above (outer side) the annealed portion 80, 50, an amount of deformation of the annealed portion 80, 50 becomes greater. In this manner, since the annealed portion 80, 50 of the metal base material that is relatively soft can take up most of the part of the plastic deformation, it can contribute to the reduction of the springback.

EXAMPLES

Hereinafter, test results and evaluation results of the present disclosure will be shown. Note that the present disclosure is not limited to examples related to the following tests.

A first example will be described. In the first example, a copper alloy board FAS-680 (thickness 0.25 mm, H material) manufactured by Furukawa Electric Co., Ltd. was used as the metal base material of the terminal. FAS-680 is an alloy having a composition containing 2.0 to 2.8 mass % nickel (Ni), 0.45 to 0.6 mass % silicon (Si), 0.4 to 0.55 mass % zinc (Zn), 0.1 to 0.25 mass % tin (Sn), 0.05 to 0.2 mass % magnesium (Mg), and the balance is copper (Cu) and incidental impurities. FAS-680 has a Vickers hardness of approximately 200 Hv. At least at a part of the metal base material in which the weld portion was formed, a metal member on which a tin plating was applied was used as a plating portion.

The core wire of the aluminum wire was an aluminum alloy MSA1 (wire, wire size 0.43 mm) manufactured by Furukawa Electric Co., Ltd. MSA1 is an alloy having a composition of approximately 0.2% iron (Fe), approximately 0.2% copper (Cu), approximately 0.1% magnesium (Mg), approximately 0.04% silicon (Si), and the balance is aluminum (Al) and incidental impurities. A 2.5 sq, 19 strand twisted wire was made using MSA1.

An un-weld portion of the crimp portion formed in a C-shape was welded by laser welding to form a tubular crimp portion. By this welding, the annealed portion was obtained in the metal base material of the tubular crimp portion. Also, the number of wire engaging portions and the hardness of the annealed portion were changed by changing various conditions. Note that, as for the one provided with wire engaging grooves (serrations), the grooves were provided by partially melting an inner side of the tubular crimp portion by a fiber laser in advance before laser welding. In this case, it is likely that the groove has a semicircular shape when viewed in a cross section in the longitudinal direction of the tubular crimp portion (FIG. 5, the shape of 34*b*).

Making the end portions of the non-weld portion of the metal member to butt with each other and welding the butted portion is referred to as "butt welding". Making the end portions of the non-weld portion of the metal member to overlap with each other and welding the overlapped portion is referred to as "lapped welding". Providing an un-weld portion of the metal member at an angle with respect to the longitudinal direction of the terminal and welding along this is referred to as "angled welding". The welding of the tubular crimp portion may be any of these methods and may be any other appropriate method.

Experiment conditions are as follows:
Laser source used: 500 W CW fiber laser ASF1J233 (wavelength 1,084 nm single-mode oscillation laser light) manufactured by Furukawa Electric Co., Ltd.
Sweep irradiation using a galvano scanner (non-telecentric)
Laser light power: 300, 400, 500 W
Sweep rate: 90, 135, 180 mm/sec.
Sweep distance: 9 mm
Laser light irradiation with all conditions focused (spot size: 0.02 mm)

As for the tubular crimp portion of the terminal manufactured under the aforementioned conditions, an area ratio of the annealed portion having a Vickers hardness of 70 to 90% of a copper alloy board FAS-680 in a cross section perpendicular to the longitudinal direction of the tubular crimp portion was observed. In order to calculate the area ratio, the tubular crimp portion was cut perpendicularly to the longitudinal direction, and the Vickers hardness was measured at a certain interval for an entire periphery for its O-shaped cross section. Note that, measurement was performed at least at ten points or more. In this example, 20 points or more were measured if possible. Also, measurements were made substantially at the center point of the thickness of the base material. The Vickers hardness was measured in conformity with JIS Z 2244. Then, the area ratio was obtained by dividing "the number of points at which the Vickers hardness is 70 to 90% of the hardness of the base material metal" by "the number of measurement points".

An environmental test was performed on the obtained samples. Thereafter, the termination connection structure of the electric wire as shown in FIG. 4 was manufactured, and corrosive property was evaluated by cross-sectional observation of an amount of corrosion of an aluminum wire of the crimp portion using an optical microscope. Evaluation results are indicated using the following symbols. Symbol ⊚ denotes that aluminum wire remains without corrosion. Symbol ○ denotes that some corrosion (spot-like corrosion and pitting corrosion) was observed in an outer periphery of the aluminum. Symbol Δ denotes that 50% or more area ratio of the aluminum wire remained. Symbol x denotes that 50% or more area ratio of aluminum disappeared.

The workability was evaluated using crack appearance after crimping. Evaluation was made by observing the surface and the cross section of the tubular crimp portion with an electron microscope such as an SEM (Scanning Electron Microscope). Symbol ⊚ denotes that no creases or the like were observed. Symbol ○ denotes that creases were observed but with no cracks were produced. Symbol Δ denotes that cracks were produced but only superficially. Symbol x denotes that cracks penetrating through the base material were produced.

The springback was evaluated by comparing a resistance value of the core wire of the electric wire 10 cm away from a wire insertion opening of the tubular crimp portion of the terminal immediately after the crimping with a resistance value at the same position after letting stand for one week in an indoor environment. It is known that when a springback occurs, a contact pressure at a contact part between the electric wire and the metal member decreases and thus a resistance value of the electric wire increases. Therefore, an amount of increase in the resistance value of the electric wire was evaluated as an evaluation of the springback. The resistance value was measured using Hioki 3560 AC Milliohm HiTester.

The environmental test was carried out with the following procedure. A sample terminal was inserted into a cavity space, and set in each test device such that an electric wire-side faces the ceiling and a terminal-side faces the ground, and such that the cavity space is suspended in the air. Note that (2) is performed immediately after (1) without washing.
(1) Salt Spray Test: 5 mass % salt water, 35° C., let stand for 96 hours
(2) Moist-Heat Shelf Test: Let stand for 96 hours in an environment of temperature 80° C. and room humidity (RH) 95%.
(3) Rinse in water (ion exchanged water)
(4) Drying The aforementioned various test results and evaluation results are shown in Tables 1-1 to 1-3.

TABLE 1-1

| | | SAMPLE CONDITION | | | | | |
|---|---|---|---|---|---|---|---|
| | | | LASER WELDING CONDITION | | SERRATION (NUMBER OF SERRATIONS) | | AREA RATIO OF ANNEALED PORTION IN CROSS-SECTIONAL OBSERVATION % |
| | BASE MATERIAL | HOW TO SET PRIOR TO WELDING | LASER POWER (W) | SWEEP RATE (mm/sec) | CRIMP PORTION | REAR END PORTION | |
| EXAMPLE | FAS-680 | BUTTED | 300 | 90 | 0 | 0 | 50 |
| | | | 400 | | | | 55 |
| | | | 500 | | | | 60 |
| | | | 300 | 135 | | | 30 |
| | | | 400 | | | | 35 |
| | | | 500 | | | | 40 |
| | | | 300 | 180 | | | 10 |
| | | | 400 | | | | 15 |
| | | | 500 | | | | 20 |
| | | | 300 | 90 | 1 | 0 | 50 |
| | | | 400 | | | | 55 |
| | | | 500 | | | | 60 |
| | | | 300 | 135 | | | 30 |
| | | | 400 | | | | 35 |
| | | | 500 | | | | 40 |
| | | | 300 | 180 | | | 10 |
| | | | 400 | | | | 15 |
| | | | 500 | | | | 20 |

| VICKERS HARDNESS Hv | |
|---|---|
| TERMINAL BASE MATERIAL | ANNEALED PORTION |
| 220 | 172 |
| 204 | 160 |
| 204 | 153 |
| 210 | 169 |
| 220 | 161 |
| 204 | 153 |
| 211 | 157 |
| 213 | 155 |
| 213 | 162 |
| 212 | 165 |
| 201 | 160 |
| 210 | 170 |
| 209 | 172 |
| 208 | 158 |
| 204 | 162 |
| 220 | 157 |
| 206 | 160 |
| 201 | 157 |

| | EVALUATION RESULT | | | |
|---|---|---|---|---|
| | RESISTANCE mΩ As | SPRING-BACK EVALUATION DIFFERENCE BETWEEN As AND RESISTANCE AFTER BEING LET STAND | WORKABILITY EVALUATION CRACKING AFTER CRIMPING | ANTICORROSION PROPERTY EVALUATION AMOUNT OF CORROSION AFTER ENVIRONMENTAL TEST |
| EXAMPLE | 1.71 | 0.18 | Δ | ○ |
| | 1.74 | 0.03 | ○ | ○ |
| | 1.74 | 0.19 | Δ | ○ |
| | 1.74 | 0.01 | ○ | ○ |
| | 1.74 | 0.03 | ⊚ | ○ |
| | 1.70 | 0.02 | ○ | ○ |
| | 1.70 | 0.11 | Δ | ○ |
| | 1.71 | 0.02 | ○ | ○ |
| | 1.73 | 0.14 | Δ | ○ |
| | 1.64 | 0.16 | Δ | ○ |
| | 1.64 | 0.01 | ○ | ○ |
| | 1.61 | 0.18 | Δ | ○ |
| | 1.61 | 0.03 | ○ | ○ |
| | 1.62 | 0.03 | ⊚ | ○ |
| | 1.64 | 0.02 | ○ | ○ |
| | 1.64 | 0.12 | Δ | ○ |
| | 1.63 | 0.03 | ○ | ○ |
| | 1.63 | 0.19 | Δ | ○ |

TABLE 1-2

| | | SAMPLE CONDITION | | | | | | VICKERS HARDNESS Hv | |
|---|---|---|---|---|---|---|---|---|---|
| | | | LASER WELDING CONDITION | | SERRATION (NUMBER OF SERRATIONS) | | AREA RATIO OF ANNEALED PORTION IN CROSS-SECTIONAL OBSERVATION % | | |
| | BASE MATERIAL | HOW TO SET PRIOR TO WELDING | LASER POWER (W) | SWEEP RATE (mm/sec) | CRIMP PORTION | REAR END PORTION | | TERMINAL BASE MATERIAL | ANNEALED PORTION |
| EXAMPLE | FAS-680 | BUTTED | 300 | 90 | 0 | 1 | 50 | 201 | 166 |
| | | | 400 | | | | 55 | 200 | 161 |
| | | | 500 | | | | 60 | 201 | 166 |
| | | | 300 | 135 | | | 30 | 219 | 168 |
| | | | 400 | | | | 35 | 215 | 170 |
| | | | 500 | | | | 40 | 217 | 164 |

TABLE 1-2-continued

| | | | | | | |
|---|---|---|---|---|---|---|
| 300 | 180 | | | 10 | 206 | 153 |
| 400 | | | | 15 | 206 | 156 |
| 500 | | | | 20 | 206 | 153 |
| 300 | 90 | 1 | 1 | 50 | 216 | 165 |
| 400 | | | | 55 | 200 | 153 |
| 500 | | | | 60 | 205 | 160 |
| 300 | 135 | | | 30 | 210 | 162 |
| 400 | | | | 35 | 218 | 164 |
| 500 | | | | 40 | 204 | 168 |
| 300 | 180 | | | 10 | 205 | 172 |
| 400 | | | | 15 | 218 | 157 |
| 500 | | | | 20 | 203 | 157 |

| | | EVALUATION RESULT | | | |
|---|---|---|---|---|---|
| | | RESISTANCE mΩ As | SPRING-BACK EVALUATION DIFFERENCE BETWEEN As AND RESISTANCE AFTER BEING LET STAND | WORKABILITY EVALUATION CRACKING AFTER CRIMPING | ANTICORROSION PROPERTY EVALUATION AMOUNT OF CORROSION AFTER ENVIRONMENTAL TEST |
| EXAMPLE | | 1.74 | 0.11 | Δ | ◎ |
| | | 1.74 | 0.03 | ○ | ◎ |
| | | 1.74 | 0.17 | Δ | ◎ |
| | | 1.72 | 0.01 | ○ | ◎ |
| | | 1.72 | 0.01 | ◎ | ◎ |
| | | 1.73 | 0.02 | ○ | ◎ |
| | | 1.72 | 0.16 | Δ | ◎ |
| | | 1.73 | 0.03 | ○ | ◎ |
| | | 1.70 | 0.11 | Δ | ◎ |
| | | 1.60 | 0.12 | Δ | ◎ |
| | | 1.61 | 0.01 | ○ | ◎ |
| | | 1.64 | 0.18 | Δ | ◎ |
| | | 1.62 | 0.01 | ○ | ◎ |
| | | 1.61 | 0.02 | ◎ | ◎ |
| | | 1.61 | 0.01 | ○ | ◎ |
| | | 1.60 | 0.19 | Δ | ◎ |
| | | 1.61 | 0.02 | ○ | ◎ |
| | | 1.60 | 0.17 | Δ | ◎ |

TABLE 1-3

| | | | SAMPLE CONDITION | | | | | |
|---|---|---|---|---|---|---|---|---|
| | | | | LASER WELDING CONDITION | | SERRATION (NUMBER OF SERRATIONS) | | AREA RATIO OF ANNEALED PORTION IN CROSS-SECTIONAL OBSERVATION % | VICKERS HARDNESS Hv | |
| | BASE MATERIAL | HOW TO SET PRIOR TO WELDING | LASER POWER (W) | SWEEP RATE (mm/sec) | CRIMP PORTION | REAR END PORTION | | TERMINAL BASE MATERIAL | ANNEALED PORTION |
| EXAMPLE | FAS-680 | BUTTED | 300 | 90 | 2 | 2 | 50 | 212 | 156 |
| | | | 400 | | | | 55 | 218 | 169 |
| | | | 500 | | | | 60 | 200 | 163 |
| | | | 300 | 135 | | | 30 | 209 | 168 |
| | | | 400 | | | | 35 | 217 | 169 |
| | | | 500 | | | | 40 | 211 | 156 |
| | | | 300 | 180 | | | 10 | 216 | 153 |
| | | | 400 | | | | 15 | 211 | 156 |
| | | | 500 | | | | 20 | 200 | 171 |
| | | LAPPED | 400 | 135 | 0 | 0 | 35 | 202 | 165 |
| | | | | | 1 | 1 | 35 | 206 | 154 |
| | | ANGLED | 400 | 135 | 0 | 0 | 35 | 218 | 157 |
| | | | | | 1 | 1 | 35 | 206 | 169 |
| COMPARATIVE EXAMPLE | | F CRIMP | | | | | — | 212 | — |
| | | BUTTED | 300 | 40 | 0 | 0 | 80 | 211 | 191 |
| | | | 500 | 230 | 0 | 0 | 5 | 214 | 88 |

TABLE 1-3-continued

|  | | EVALUATION RESULT | | |
|---|---|---|---|---|
|  | RESISTANCE mΩ As | SPRING-BACK EVALUATION DIFFERENCE BETWEEN As AND RESISTANCE AFTER BEING LET STAND | WORKABILITY EVALUATION CRACKING AFTER CRIMPING | ANTICORROSION PROPERTY EVALUATION AMOUNT OF CORROSION AFTER ENVIRONMENTAL TEST |
| EXAMPLE | 1.62 | 0.15 | △ | ◎ |
|  | 1.61 | 0.01 | ○ | ◎ |
|  | 1.61 | 0.15 | △ | ◎ |
|  | 1.62 | 0.03 | ○ | ◎ |
|  | 1.61 | 0.03 | ◎ | ◎ |
|  | 1.63 | 0.02 | ○ | ◎ |
|  | 1.63 | 0.14 | △ | ◎ |
|  | 1.62 | 0.01 | ○ | ◎ |
|  | 1.63 | 0.16 | △ | ◎ |
|  | 1.74 | 0.01 | ◎ | △ |
|  | 1.71 | 0.02 | ◎ | ○ |
|  | 1.71 | 0.01 | ◎ | △ |
|  | 1.73 | 0.03 | ◎ | ○ |
| COMPARATIVE EXAMPLE | 1.71 | 0.01 | ◎ | X |
|  | 1.70 | 0.32 | X | ○ |
|  | 1.70 | 0.22 | X | X |

Next, a second example will be described. In the second example, a general brass material C2600 (strip, thickness 0.25 mm, H material) was used as the base material of the terminal. The chemical composition of C2600 is Cu: 68.5 to 71.5 mass %, Pb: less than or equal to 0.05 mass %, Fe: less than or equal to 0.05 mass %, and the balance is Zn and incidental impurities. The Vickers hardness of an H material is approximately 150 Hv. Note that a least a part of the metal base material in which the weld portion was formed was constituted using a metal member on which a tin plating was applied as a plating portion. Other than the above, a terminal having a shape similar to that of the first example was constituted and an evaluation similar to that of the first example was performed and evaluation results thereof are shown in Tables 2-1 to 2-3.

TABLE 2-1

| | | | SAMPLE CONDITION | | | | | |
|---|---|---|---|---|---|---|---|---|
| | | | LASER WELDING CONDITION | | SERRATION (NUMBER OF SERRATIONS) | | AREA RATIO OF ANNEALED PORTION IN CROSS-SECTIONAL OBSERVATION % | VICKERS HARDNESS Hv TERMINAL | |
| | BASE MATERIAL | HOW TO SET PRIOR TO WELDING | LASER POWER (W) | SWEEP RATE (mm/sec) | CRIMP PORTION | REAR END PORTION | | BASE MATERIAL | ANNEALED PORTION |
| EXAMPLE | C2600 | BUTTED | 150 | 150 | 0 | 0 | 40 | 146 | 131 |
|  |  |  | 250 |  |  |  | 45 | 148 | 123 |
|  |  |  | 350 |  |  |  | 50 | 147 | 131 |
|  |  |  | 150 | 200 |  |  | 25 | 147 | 127 |
|  |  |  | 250 |  |  |  | 25 | 148 | 128 |
|  |  |  | 350 |  |  |  | 30 | 146 | 126 |
|  |  |  | 150 | 250 |  |  | 10 | 150 | 130 |
|  |  |  | 250 |  |  |  | 10 | 148 | 130 |
|  |  |  | 350 |  |  |  | 15 | 145 | 123 |
|  |  |  | 150 | 150 | 1 | 0 | 40 | 146 | 127 |
|  |  |  | 250 |  |  |  | 45 | 146 | 124 |
|  |  |  | 350 |  |  |  | 50 | 149 | 131 |
|  |  |  | 150 | 200 |  |  | 25 | 149 | 124 |
|  |  |  | 250 |  |  |  | 25 | 147 | 127 |
|  |  |  | 350 |  |  |  | 30 | 150 | 130 |
|  |  |  | 150 | 250 |  |  | 10 | 150 | 128 |
|  |  |  | 250 |  |  |  | 10 | 145 | 128 |
|  |  |  | 350 |  |  |  | 15 | 146 | 130 |

TABLE 2-1-continued

| | | | EVALUATION RESULT | | |
|---|---|---|---|---|---|
| | | RESISTANCE mΩ As | SPRING-BACK EVALUATION DIFFERENCE BETWEEN As AND RESISTANCE AFTER BEING LET STAND | WORKABILITY EVALUATION CRACKING AFTER CRIMPING | ANTICORROSION PROPERTY EVALUATION AMOUNT OF CORROSION AFTER ENVIRONMENTAL TEST |
| | EXAMPLE | 1.74 | 0.12 | Δ | ○ |
| | | 1.73 | 0.02 | ○ | ○ |
| | | 1.74 | 0.12 | Δ | ○ |
| | | 1.72 | 0.02 | ○ | ○ |
| | | 1.74 | 0.01 | ⊚ | ○ |
| | | 1.71 | 0.01 | ○ | ○ |
| | | 1.70 | 0.17 | Δ | ○ |
| | | 1.74 | 0.02 | ○ | ○ |
| | | 1.74 | 0.19 | Δ | ○ |
| | | 1.64 | 0.14 | Δ | ○ |
| | | 1.64 | 0.03 | ○ | ○ |
| | | 1.60 | 0.18 | Δ | ○ |
| | | 1.61 | 0.03 | ○ | ○ |
| | | 1.64 | 0.03 | ⊚ | ○ |
| | | 1.63 | 0.02 | ○ | ○ |
| | | 1.62 | 0.10 | Δ | ○ |
| | | 1.62 | 0.03 | ○ | ○ |
| | | 1.61 | 0.10 | Δ | ○ |

TABLE 2-2

| | | | SAMPLE CONDITION | | | | | |
|---|---|---|---|---|---|---|---|---|
| | | | LASER WELDING CONDITION | | SERRATION (NUMBER OF SERRATIONS) | | AREA RATIO OF ANNEALED PORTION IN CROSS-SECTIONAL OBSERVATION % | VICKERS HARDNESS Hv |
| | BASE MATERIAL | HOW TO SET PRIOR TO WELDING | LASER POWER (W) | SWEEP RATE (mm/sec) | CRIMP PORTION | REAR END PORTION | | TERMINAL BASE MATERIAL / ANNEALED PORTION |
| EXAMPLE | C2600 | BUTTED | 150 | 150 | 0 | 1 | 40 | 150 / 127 |
| | | | 250 | | | | 45 | 150 / 125 |
| | | | 350 | | | | 50 | 147 / 126 |
| | | | 150 | 200 | | | 25 | 145 / 129 |
| | | | 250 | | | | 25 | 147 / 123 |
| | | | 350 | | | | 30 | 150 / 123 |
| | | | 150 | 250 | | | 10 | 150 / 124 |
| | | | 250 | | | | 10 | 146 / 125 |
| | | | 350 | | | | 15 | 146 / 130 |
| | | | 150 | 150 | 1 | 1 | 40 | 149 / 125 |
| | | | 250 | | | | 45 | 149 / 123 |
| | | | 350 | | | | 50 | 146 / 125 |
| | | | 150 | 200 | | | 25 | 149 / 129 |
| | | | 250 | | | | 25 | 150 / 131 |
| | | | 350 | | | | 30 | 148 / 131 |
| | | | 150 | 250 | | | 10 | 148 / 132 |
| | | | 250 | | | | 10 | 147 / 127 |
| | | | 350 | | | | 15 | 148 / 129 |

| | | | EVALUATION RESULT | | |
|---|---|---|---|---|---|
| | | RESISTANCE mΩ As | SPRING-BACK EVALUATION DIFFERENCE BETWEEN As AND RESISTANCE AFTER BEING LET STAND | WORKABILITY EVALUATION CRACKING AFTER CRIMPING | ANTICORROSION PROPERTY EVALUATION AMOUNT OF CORROSION AFTER ENVIRONMENTAL TEST |
| | EXAMPLE | 1.70 | 0.11 | Δ | ⊚ |
| | | 1.74 | 0.03 | ○ | ⊚ |
| | | 1.73 | 0.18 | Δ | ⊚ |
| | | 1.73 | 0.01 | ○ | ⊚ |
| | | 1.74 | 0.01 | ⊚ | ⊚ |
| | | 1.74 | 0.02 | ○ | ⊚ |

TABLE 2-2-continued

| Resistance mΩ As | Spring-back Evaluation Difference Between As and Resistance After Being Let Stand | Workability Evaluation Cracking After Crimping | Anticorrosion Property Evaluation Amount of Corrosion After Environmental Test |
|---|---|---|---|
| 1.73 | 0.12 | Δ | ◎ |
| 1.71 | 0.03 | ○ | ◎ |
| 1.71 | 0.11 | Δ | ◎ |
| 1.63 | 0.17 | Δ | ◎ |
| 1.62 | 0.01 | ○ | ◎ |
| 1.64 | 0.11 | Δ | ◎ |
| 1.63 | 0.02 | ○ | ◎ |
| 1.60 | 0.03 | ◉ | ◎ |
| 1.61 | 0.03 | ○ | ◎ |
| 1.62 | 0.13 | Δ | ◎ |
| 1.60 | 0.02 | ○ | ◎ |
| 1.60 | 0.11 | Δ | ◎ |

TABLE 2-3

| | | | Sample Condition | | | | | |
|---|---|---|---|---|---|---|---|---|
| | | | Laser Welding Condition | | Serration (Number of Serrations) | | Area Ratio of Annealed Portion in | Vickers Hardness Hv | |
| | Base Material | How to Set Prior to Welding | Laser Power (W) | Sweep Rate (mm/sec) | Crimp Portion | Rear End Portion | Cross-Sectional Observation % | Terminal Base Material | Annealed Portion |
| Example | C2600 | BUTTED | 150 | 150 | 2 | 2 | 40 | 150 | 127 |
| | | | 250 | | | | 45 | 149 | 125 |
| | | | 350 | | | | 50 | 146 | 124 |
| | | | 150 | 200 | | | 25 | 147 | 132 |
| | | | 250 | | | | 25 | 145 | 126 |
| | | | 350 | | | | 30 | 150 | 128 |
| | | | 150 | 250 | | | 10 | 145 | 127 |
| | | | 250 | | | | 10 | 145 | 127 |
| | | | 350 | | | | 15 | 149 | 125 |
| | | LAPPED | 200 | 200 | 0 | 0 | 25 | 145 | 130 |
| | | | | | 1 | 1 | 25 | 150 | 127 |
| | | ANGLED | 200 | 200 | 0 | 0 | 25 | 150 | 131 |
| | | | | | 1 | 1 | 25 | 149 | 132 |
| Comparative Example | | | F CRIMP | | | | — | 145 | — |
| | | BUTTED | 100 | 100 | 0 | 0 | 70 | 147 | 138 |
| | | | 400 | 300 | 0 | 0 | 5 | 146 | 101 |

| | Resistance mΩ As | Spring-back Evaluation Difference Between As and Resistance After Being Let Stand | Workability Evaluation Cracking After Crimping | Anticorrosion Property Evaluation Amount of Corrosion After Environmental Test |
|---|---|---|---|---|
| Example | 1.61 | 0.12 | Δ | ◎ |
| | 1.60 | 0.02 | ○ | ◎ |
| | 1.60 | 0.19 | Δ | ◎ |
| | 1.62 | 0.01 | ○ | ◎ |
| | 1.60 | 0.01 | ◉ | ◎ |
| | 1.62 | 0.01 | ○ | ◎ |
| | 1.64 | 0.10 | Δ | ◎ |
| | 1.61 | 0.01 | ○ | ◎ |
| | 1.60 | 0.10 | Δ | ◎ |
| | 1.74 | 0.01 | ◉ | Δ |
| | 1.72 | 0.02 | ◉ | ○ |
| | 1.74 | 0.03 | ◉ | Δ |
| | 1.74 | 0.02 | ◉ | ○ |
| Comparative Example | 1.73 | 0.01 | ◉ | X |
| | 1.72 | 0.34 | X | ○ |
| | 1.72 | 0.26 | X | X |

A third example will be described below. In the first example, an aluminum alloy MSA1 (strip, thickness 0.25 mm) manufactured by Furukawa Electric Co., Ltd. was used as the base material of the terminal. MSA1 is an alloy having a composition of approximately 0.2% iron (Fe), approximately 0.2% copper (Cu), approximately 0.1% magnesium (Mg), approximately 0.04% silicon (Si), and the balance containing aluminum (Al) and incidental impurities. Note that at least a part of the metal base material in which the weld portion was formed was constituted using a metal member on which a tin plating was applied as a plating portion. Other than the above, a terminal having a shape similar to that of the first example was constituted and an evaluation similar to that of the first example was performed and evaluation results thereof are shown in Tables 3-1 to 3-3.

TABLE 3-1

| | | | SAMPLE CONDITION | | | | | |
|---|---|---|---|---|---|---|---|---|
| | | LASER WELDING CONDITION | | SERRATION (NUMBER OF SERRATIONS) | | AREA RATIO OF ANNEALED PORTION IN CROSS-SECTIONAL OBSERVATION % | VICKERS HARDNESS Hv | |
| | | LASER | SWEEP | | | | TERMINAL | |
| | HOW TO SET PRIOR TO WELDING | POWER (W) | RATE (mm/sec) | CRIMP PORTION | REAR END PORTION | | BASE MATERIAL | ANNEALED PORTION |
| BASE MATERIAL | | | | | | | | |
| EXAMPLE MSAI | BUTTED | 200 | 100 | 0 | 0 | 35 | 80 | 62 |
| | | 300 | | | | 40 | 89 | 63 |
| | | 400 | | | | 40 | 83 | 64 |
| | | 200 | 150 | | | 20 | 87 | 65 |
| | | 300 | | | | 20 | 81 | 64 |
| | | 400 | | | | 25 | 83 | 60 |
| | | 200 | 200 | | | 10 | 84 | 60 |
| | | 300 | | | | 10 | 87 | 65 |
| | | 400 | | | | 10 | 83 | 60 |
| | | 200 | 100 | 1 | 0 | 35 | 80 | 69 |
| | | 300 | | | | 40 | 89 | 64 |
| | | 400 | | | | 40 | 86 | 61 |
| | | 200 | 150 | | | 20 | 87 | 65 |
| | | 300 | | | | 20 | 88 | 64 |
| | | 400 | | | | 25 | 83 | 64 |
| | | 200 | 200 | | | 10 | 80 | 67 |
| | | 300 | | | | 10 | 80 | 65 |
| | | 400 | | | | 10 | 87 | 62 |

| | EVALUATION RESULT | | | |
|---|---|---|---|---|
| | RESISTANCE mΩ As | SPRING-BACK EVALUATION DIFFERENCE BETWEEN As AND RESISTANCE AFTER BEING LET STAND | WORKABILITY EVALUATION CRACKING AFTER CRIMPING | ANTICORROSION PROPERTY EVALUATION AMOUNT OF CORROSION AFTER ENVIRONMENTAL TEST |
| EXAMPLE | 1.81 | 0.10 | Δ | ○ |
| | 1.83 | 0.01 | ○ | ○ |
| | 1.82 | 0.13 | Δ | ○ |
| | 1.82 | 0.01 | ○ | ○ |
| | 1.80 | 0.02 | ◎ | ○ |
| | 1.84 | 0.01 | ○ | ○ |
| | 1.84 | 0.14 | Δ | ○ |
| | 1.83 | 0.01 | ○ | ○ |
| | 1.80 | 0.11 | Δ | ○ |
| | 1.74 | 0.15 | Δ | ○ |
| | 1.73 | 0.01 | ○ | ○ |
| | 1.74 | 0.17 | Δ | ○ |
| | 1.70 | 0.01 | ○ | ○ |
| | 1.73 | 0.01 | ◎ | ○ |
| | 1.71 | 0.01 | ○ | ○ |
| | 1.70 | 0.19 | Δ | ○ |
| | 1.71 | 0.02 | ○ | ○ |
| | 1.74 | 0.10 | Δ | ○ |

TABLE 3-2

| | | SAMPLE CONDITION | | | | | | |
|---|---|---|---|---|---|---|---|---|
| | | | LASER WELDING CONDITION | | SERRATION (NUMBER OF SERRATIONS) | | AREA RATIO OF ANNEALED PORTION IN CROSS-SECTIONAL OBSERVATION % | VICKERS HARDNESS Hv | |
| | BASE MATERIAL | HOW TO SET PRIOR TO WELDING | LASER POWER (W) | SWEEP RATE (mm/sec) | CRIMP PORTION | REAR END PORTION | | TERMINAL BASE MATERIAL | ANNEALED PORTION |
| EXAMPLE | MSAl | BUTTED | 200 | 100 | 0 | 1 | 35 | 80 | 66 |
| | | | 300 | | | | 40 | 89 | 67 |
| | | | 400 | | | | 40 | 89 | 67 |
| | | | 200 | 150 | | | 20 | 84 | 61 |
| | | | 300 | | | | 20 | 86 | 68 |
| | | | 400 | | | | 25 | 83 | 63 |
| | | | 200 | 200 | | | 10 | 81 | 64 |
| | | | 300 | | | | 10 | 85 | 68 |
| | | | 400 | | | | 10 | 86 | 63 |
| | | | 200 | 100 | 1 | 1 | 35 | 83 | 60 |
| | | | 300 | | | | 40 | 82 | 63 |
| | | | 400 | | | | 40 | 87 | 68 |
| | | | 200 | 150 | | | 20 | 85 | 63 |
| | | | 300 | | | | 20 | 89 | 65 |
| | | | 400 | | | | 20 | 86 | 62 |
| | | | 200 | 200 | | | 10 | 81 | 64 |
| | | | 300 | | | | 10 | 88 | 64 |
| | | | 400 | | | | 10 | 80 | 61 |

| | EVALUATION RESULT | | | |
|---|---|---|---|---|
| | RESISTANCE mΩ As | SPRING-BACK EVALUATION DIFFERENCE BETWEEN As AND RESISTANCE AFTER BEING LET STAND | WORKABILITY EVALUATION CRACKING AFTER CRIMPING | ANTICORROSION PROPERTY EVALUATION AMOUNT OF CORROSION AFTER ENVIRONMENTAL TEST |
| EXAMPLE | 1.81 | 0.14 | Δ | ◎ |
| | 1.80 | 0.03 | ○ | ◎ |
| | 1.82 | 0.19 | Δ | ◎ |
| | 1.81 | 0.01 | ○ | ◎ |
| | 1.83 | 0.02 | ◎ | ◎ |
| | 1.84 | 0.01 | ○ | ◎ |
| | 1.82 | 0.15 | Δ | ◎ |
| | 1.81 | 0.03 | ○ | ◎ |
| | 1.82 | 0.12 | Δ | ◎ |
| | 1.72 | 0.16 | Δ | ◎ |
| | 1.71 | 0.03 | ○ | ◎ |
| | 1.72 | 0.14 | Δ | ◎ |
| | 1.74 | 0.01 | ○ | ◎ |
| | 1.73 | 0.03 | ◎ | ◎ |
| | 1.73 | 0.01 | ○ | ◎ |
| | 1.73 | 0.12 | Δ | ◎ |
| | 1.74 | 0.02 | ○ | ◎ |
| | 1.74 | 0.15 | Δ | ◎ |

TABLE 3-3

| | | SAMPLE CONDITION | | | | | | |
|---|---|---|---|---|---|---|---|---|
| | | | LASER WELDING CONDITION | | SERRATION (NUMBER OF SERRATIONS) | | AREA RATIO OF ANNEALED PORTION IN CROSS-SECTIONAL OBSERVATION % | VICKERS HARDNESS Hv | |
| | BASE MATERIAL | HOW TO SET PRIOR TO WELDING | LASER POWER (W) | SWEEP RATE (mm/sec) | CRIMP PORTION | REAR END PORTION | | TERMINAL BASE MATERIAL | ANNEALED PORTION |
| EXAMPLE | MSAl | BUTTED | 200 | 100 | 2 | 2 | 35 | 87 | 69 |
| | | | 300 | | | | 40 | 83 | 69 |
| | | | 400 | | | | 40 | 88 | 66 |
| | | | 200 | 150 | | | 20 | 85 | 62 |
| | | | 300 | | | | 20 | 84 | 63 |
| | | | 400 | | | | 20 | 84 | 66 |

TABLE 3-3-continued

| | | | | | | | | | |
|---|---|---|---|---|---|---|---|---|---|
| | | | 200 | 200 | | | 10 | 84 | 60 |
| | | | 300 | | | | 10 | 88 | 65 |
| | | | 400 | | | | 10 | 85 | 63 |
| | | LAPPED | 300 | 150 | 0 | 0 | 20 | 84 | 66 |
| | | | | | 1 | 1 | 20 | 87 | 63 |
| | | ANGLED | 300 | 150 | 0 | 0 | 20 | 82 | 68 |
| | | | | | 1 | 1 | 20 | 86 | 61 |
| COM- | | F CRIMP | | | | | — | 86 | — |
| PAR- | BUTTED | | 100 | 50 | 0 | 0 | 65 | 86 | 78 |
| ATIVE | | | 500 | 250 | 0 | 0 | 5 | 86 | 60 |
| EXAM- | | | | | | | | | |
| PLE | | | | | | | | | |

| | | EVALUATION RESULT | | |
|---|---|---|---|---|
| | RESISTANCE mΩ As | SPRING-BACK EVALUATION DIFFERENCE BETWEEN As AND RESISTANCE AFTER BEING LET STAND | WORKABILITY EVALUATION CRACKING AFTER CRIMPING | ANTICORROSION PROPERTY EVALUATION AMOUNT OF CORROSION AFTER ENVIRONENTAL TEST |
| EXAM- | 1.71 | 0.18 | Δ | ⊚ |
| PLE | 1.74 | 0.02 | ○ | ⊚ |
| | 1.74 | 0.18 | Δ | ⊚ |
| | 1.74 | 0.03 | ○ | ⊚ |
| | 1.73 | 0.03 | ⊚ | ⊚ |
| | 1.73 | 0.03 | ○ | ⊚ |
| | 1.71 | 0.12 | Δ | ⊚ |
| | 1.73 | 0.03 | ○ | ⊚ |
| | 1.71 | 0.12 | Δ | ⊚ |
| | 1.70 | 0.01 | ⊚ | Δ |
| | 1.74 | 0.01 | ⊚ | ○ |
| | 1.73 | 0.01 | ⊚ | Δ |
| | 1.71 | 0.03 | ⊚ | ○ |
| COM- | 1.71 | 0.01 | ⊚ | X |
| PAR- | 1.72 | 0.36 | X | ○ |
| ATIVE | 1.72 | 0.24 | X | X |
| EXAM- | | | | |
| PLE | | | | |

As can be seen from Tables 1-1 to 1-3, when the annealed portion having a hardness (Vickers hardness) of 72 to 84% of the hardness of the copper alloy base material has 10 to 60% of an area ratio with respect to the tubular crimp portion, cracking after crimping, which is workability evaluation, showed evaluations indicated by symbol ⊚, symbol ○, and symbol Δ. Also for lapped welding and angled welding, the cracking after crimping, which is workability evaluation, showed evaluations indicated by symbol ○, and good results were obtained. Further, the amount of corrosion after the environmental test as an anticorrosion evaluation had a good corrosion performance which showed that, in the case of butt welding, the aluminum core wire remained without corrosion (symbol ⊚) or, some corrosion (spot-like corrosion and pitting corrosion) was observed in an outer periphery of the aluminum core wire (symbol ○). Also for lapped welding and angled welding, some corrosion (spot-like corrosion and pitting corrosion) was observed in an outer periphery of the aluminum core wire (symbol ○) or 50% or more area ratio of the aluminum core wire remained (symbol Δ).

Also, as can be seen from Tables 2-1 to 2-3, when the annealed portion having a hardness (Vickers hardness) of 82 to 90% of the hardness of the copper alloy base material has 5 to 50% of an area ratio with respect to the tubular crimp portion, the cracking after crimping, which is workability evaluation, showed evaluations indicated by symbol ⊚, symbol ○, and symbol Δ. Also for lapped welding and angled welding, the cracking after crimping, which is workability evaluation, showed evaluations indicated by symbol ○, and good results were obtained. Further, the amount of corrosion after the environmental test as an anticorrosion evaluation had a good corrosion performance which showed that, in the case of butt welding, the aluminum core wire remained without corrosion (symbol ⊚), or, some corrosion (spot-like corrosion and pitting corrosion) was observed in an outer periphery of the aluminum core wire (symbol ○). Also for lapped welding and angled welding, some corrosion (spot-like corrosion and pitting corrosion) was observed in an outer periphery of the aluminum core wire (symbol ○) or 50% or more area ratio of the aluminum core wire remained (symbol Δ).

On the other hand, in a comparative example in which the tubular crimp portion does not have an annealed portion, the cracking after crimping showed evaluation indicated by symbol ○, but the amount of corrosion after the environmental test showed an evaluation that 50% or more area ratio of aluminum has disappeared (symbol x).

Further, as can be seen from Tables 3-1 to 3-3, when the annealed portion having a hardness (Vickers hardness) of 70 to 87% of the hardness of the aluminum alloy base material has 5 to 40% of an area ratio with respect to the tubular crimp portion, the cracking after crimping, which is workability evaluation, showed evaluations indicated by symbol ⊚, symbol ○, and symbol Δ. Also for lapped welding and angled welding, the cracking after crimping, which is workability evaluation, showed evaluations indicated by symbol ⊚, and good results were obtained. Further, the amount of corrosion after the environmental test as an anticorrosion evaluation had a good corrosion performance which showed that, in the case of butt welding, the aluminum core wire remained without corrosion (symbol ⊚), or, some corrosion (spot-like corrosion and pitting corrosion) was observed in an outer periphery of the aluminum core wire (symbol ○). Also for lapped welding and angled welding, some corrosion (spot-like corrosion and pitting corrosion) was observed in an outer periphery of the aluminum core wire (symbol ○) or 50% or more area ratio of the aluminum core wire remained (symbol Δ).

Thus, it was found that, with the terminal having the annealed portion that was softer than the hardness of the metal base material in the tubular crimp portion, the cracking after crimping can be reduced and springback can be prevented by suppressing an amount of corrosion after the environmental test. Also, it was found that, when viewed in a cross section perpendicular to the longitudinal direction of a tubular crimp portion, if the annealed portion having a hardness of 70 to 90% of the hardness of the base material constituting the terminal has an area ratio of 5 to 60% of the tubular crimp portion, the cracking after crimping can be reduced and springback can be prevented by suppressing an amount of corrosion after the environmental test.

Next, a fourth example will be described. In the fourth example, a copper alloy FAS-680 (thickness 0.25 mm) manufactured by Furukawa Electric Co., Ltd. was used as the base material of the terminal 1. FAS-680 is an alloy having a composition containing 2.0 to 2.8 mass % nickel (Ni), 0.45 to 0.6 mass % silicon (Si), 0.4 to 0.55 mass % zinc (Zn), 0.1 to 0.25 mass % tin (Sn), 0.05 to 0.2 mass % magnesium (Mg), and the balance is copper (Cu) and incidental impurities. At least at a part of the metal base material in which the weld portion was formed was constituted using a metal member on which a tin plating was applied was used as a plating portion.

The core wire of the aluminum wire was a wire having a wire size of 0.43 mm. The composition of the alloy of the core wire contains approximately 0.2% iron (Fe), approximately 0.2% copper (Cu), approximately 0.1% magnesium (Mg), approximately 0.04% silicon (Si), and the balance is aluminum (Al) and incidental impurities. A 2.5 sq (mm²), 19 strand twisted wire was made using this core wire.

surfaces thereof) in a cross section perpendicular to the longitudinal direction of the tubular crimp portion 30 was observed. As has been described above, for the calculation of the area ratio, the tubular crimp portion was cut perpendicularly to the longitudinal direction and its cross section was observed with an SEM (Scanning Electron Microscope) and the weld portion 70 and the non-weld portion 100 (the normal portion 90 and the annealed portion 80, and a plating portion optionally provided on the surface of the metal base material thereof) were identified. Note that, as a measured value of the area ratio, measurements were performed ten times for the samples made under the same condition and an average value thereof was rounded off to one decimal place. For numerical values obtained in this manner, an error range of measurement was taken as +−0.2%, and indicated by taking 0.5% as a unit. For example, when the measurement value of the area ratio is in the range of 2.8 to 3.2, it was evaluated as 3.0.

The evaluation of the workability was performed using crack appearance after crimping. Specifically, the evaluation was performed by observing the surface and the cross section of the tubular crimp portion with an electron microscope such as an SEM (Scanning Electron Microscope) and categorized using symbol ⊚ which denotes that no creases or the like were observed, symbol ○ which denotes that creases are observed but no cracks were produced, symbol Δ which denotes that cracks were produced but only superficially, and symbol x which denotes that cracks penetrating through the base material were produced.

Experiment conditions are as follows:
Laser source used: 500 W CW fiber laser ASF1J233 (wavelength 1,084 nm single-mode oscillation laser light) manufactured by Furukawa Electric Co., Ltd.
Laser light power: 300, 400, 500 W
Sweep rate: 90, 135, 180 mm/sec.
Sweep distance: 9 mm
Laser light irradiation with all conditions focused (spot size: 0.02 mm)

The aforementioned various test results and evaluation results are shown in Table 4.

TABLE 4

| | SAMPLE CONDITION LASER WELDING CONDITION | | | EVALUATION RESULT | |
| --- | --- | --- | --- | --- | --- |
| | | | | AREA RATIO OF WELD PORTION IN CROSS- | WORKABILITY EVALUATION |
| | BASE MATERIAL | LASER POWER (W) | SWEEP RATE (mm/sec) | SECTIONAL OBSERVATION % | CRACKING AFTER CRIMPING |
| EXAMPLE | FAS-680 | 300 | 90 | 3.0 | Δ |
| | | 400 | | 3.5 | ○ |
| | | 500 | | 5.0 | Δ |
| | | 300 | 135 | 2.5 | ○ |
| | | 400 | | 3.0 | ⊚ |
| | | 500 | | 3.5 | ○ |
| | | 300 | 180 | 2.0 | Δ |
| | | 400 | | 2.5 | ○ |
| | | 500 | | 3.0 | Δ |
| COMPARATIVE EXAMPLE | FAS-680 | 300 | 200 | 1.0 | X |
| | | 500 | 80 | 6.0 | X |

The tubular crimp portion 30 of the terminal 1 was formed by laser welding the crimp portion as described above. As for the tubular crimp portion 30 formed in such a manner, an area ratio of the weld portion 70 with respect to the non-weld portion 100 (the normal portion 90 and the annealed portion 80 as well as a plating portion optionally provided on As can be seen from Table 4, when the tubular crimp portion was observed in a cross section perpendicular to the longitudinal direction thereof, in a case where the area ratio of the weld portion 70 with respect to the non-weld portion 100 is 2 to 5%, the cracking after crimping, which was used in workability evaluation, showed evaluations indicated by symbol ⊚, symbol ○, and symbol Δ. Note that, as has been described above, the workability evaluation was performed by carrying out a cross sectional observation of the cracking after cramping and categorized using symbol ⊚ which denotes that no creases or the like were observed, symbol ○ which denotes that creases were observed but no cracks were produced, symbol Δ which denotes that cracks were produced but only superficially, and symbol x which denotes that cracks penetrating through the base material were produced.

Referring to Table 4, the highest evaluation indicated by symbol ⊚ was obtained in a case where the laser power was 400 (W) and the sweep rate was 135 (mm/sec). The second highest evaluation indicated by the symbol ○ was obtained in a case where the laser power was 300 (W) and the sweep rate was 135 (mm/sec), a case where the laser power was 400 (W) and the sweep rate was 90 or 180 (mm/sec), and a case where the laser power was 500 (W) and the sweep rate was 135 (mm/sec). The evaluation indicated by the symbol Δ was obtained in a case where the laser power was 300 (W) and the sweep rate was 90 or 180 (mm/sec) and a case where the laser power was 500 (W) and the sweep rate was 90 or 180 (mm/sec).

Considering the above in relation to the area ratio of the weld portion 70 with respect to the non-weld portion 100 viewed in a cross section perpendicular to the longitudinal direction of the tubular crimp portion 30, the following was obtained. In the case of the laser power of 400 (W) and the sweep rate of 135 (mm/sec) for which the highest evaluation indicated by the symbol ⊚ was obtained, the area ratio was approximately 3. In the cases of the laser power of 300 (W) and the sweep rate of 135 (mm/sec), the laser power of 400 (W) and the sweep rate of 90 or 180 (mm/sec), and the laser power of 500 (W) and the sweep rate of 135 (mm/sec) for which the second highest evaluation of the symbol ○ were obtained, the area ratio was 2.5 or 3.5. Further, in the cases of the laser power of 300 (W) and the sweep rate of 90 or 180 (mm/sec), and the laser power 500 (W) of the sweep rate of 90 or 180 (mm/sec) for which the evaluation of the symbol Δ was obtained, the area ratio was 3.0, 2.0 or 5.0

From the test results mentioned above, when laser welding is performed in such a manner that the region of the weld portion 70 has an area ratio of 2 to 5% with respect to the region of the non-weld portion 100 (the normal portion 90 and annealed portion 80, and the plating portion optionally provided on the surface of metal base material thereof) when viewed in a cross section perpendicular to the longitudinal direction of the tubular crimp portion 30, the evaluation was "cracks were produced but only superficially" or better, and it was seen that the cracking during crimping of the tubular crimp portion 30 (cracks penetrating through the base material) can be prevented.

As described above, it was seen that the cracking during crimping in the tubular crimp portion 30 of the present disclosure can be prevented by setting the area ratio of the weld portion 70 with respect to the region of the non-weld portion 100 (the normal portion 90 and annealed portion 80, and the plating portion optionally provided on the surface of the metal base material thereof) as described above, when forming the tubular crimp portion 30 by laser welding. In the present disclosure, a preferable ratio of the area ratio between the weld portion and the non-weld portion was found under the contradicting requirements of "workability" and "strength", while considering the property of the weld portion which is easy to be bent but has a reduced strength due to annealing and the property of the non-weld portion which is more difficult to be bent but has an increased strength as compared to the weld portion. As has been described above, the fourth example can be implemented in addition to or separately from the first example.

Next, a fifth example will be described. In the fifth example, the base material of the terminal 1 was an aluminum alloy MSA1 (strip, thickness 0.25 mm) manufactured by Furukawa Electric Co., Ltd. MSA1 is an alloy having a composition containing approximately 0.2% iron (Fe), approximately 0.2% copper (Cu), approximately 0.1% magnesium (Mg), approximately 0.04% silicon (Si), and the balance is aluminum (Al) and incidental impurities. At least at a part of the metal base material in which the weld portion is formed was constituted using a metal member on which a tin plating was applied as a plating portion.

The core wire of the aluminum wire and the tubular crimp portion 30 of the terminal 1 are formed in a similar manner to the case for the aforementioned copper alloy. Also, the area ratio of the weld portion 70 with respect to the region of the non-weld portion 100 (the normal portion 90 and annealed portion 80, and the plating portion optionally provided on the surface of the metal base material thereof) when viewed in a cross section perpendicular to the longitudinal direction of the tubular crimp portion 30 was identified in a manner similar to the case of the copper alloy described above.

Similarly to the above, the evaluation of the workability was performed using crack appearance after crimping. Evaluation was made by observing the surface and the cross section of the tubular crimp portion with an electron microscope such as the SEM (Scanning Electron Microscope), and categorizing using symbol ⊚ which denotes that no creases or the like were observed, symbol ○ which denotes that creases were observed but no cracks were produced, symbol Δ which denotes that cracks were produced but only superficially, and symbol x which denotes that cracks penetrating through the base material were produced.

Experiment conditions are as follows:
Laser source used: 500 W CW fiber laser ASF1J233 (wavelength 1,084 nm single-mode oscillation laser light) manufactured by Furukawa Electric Co., Ltd.
Laser light power: 200, 300, 400 W
Sweep rate: 100, 150, 200 mm/sec.
Sweep distance: 9 mm
Laser light irradiation with all conditions focused (spot size: 0.02 mm)
The aforementioned various test results and evaluation results are shown in Table 5.

TABLE 5

| | SAMPLE CONDITION LASER WELDING CONDITION | | | EVALUATION RESULT | |
| --- | --- | --- | --- | --- | --- |
| | | | | AREA RATIO OF WELD PORTION IN CROSS- | WORKABILITY EVALUATION |
| | BASE MATERIAL | LASER POWER (W) | SWEEP RATE (mm/sec) | SECTIONAL OBSERVATION % | CRACKING AFTER CRIMPING |
| EXAMPLE | MSAL | 200 | 100 | 3.0 | Δ |
| | | 300 | | 3.5 | ○ |
| | | 400 | | 5.0 | Δ |
| | | 200 | 150 | 2.5 | ○ |
| | | 300 | | 3.0 | ⊚ |
| | | 400 | | 3.5 | ○ |
| | | 200 | 200 | 2.0 | Δ |
| | | 300 | | 2.5 | ○ |
| | | 400 | | 3.0 | Δ |
| COMPARATIVE EXAMPLE | MSAL | 200 | 200 | 1.0 | X |
| | | 400 | 80 | 6.0 | X |

As can be seen from Table 5, when the tubular crimp portion was observed in a cross section perpendicular to the longitudinal direction thereof, in a case where the area ratio of the weld portion 70 with respect to the non-weld portion 100 is 2 to 5%, the cracking after crimping which was used for workability evaluation was evaluated using symbol ⊚, symbol ○, and symbol Δ. Note that, as has been described above, the workability evaluation was performed by carrying out a cross sectional observation of the cracking after cramping and categorizing using symbol ⊚ which denotes that no creases were observed, symbol ○ which denotes that creases were observed but no cracks were produced, symbol Δ which denotes that cracks were produced but only superficially, and symbol x which denotes that cracks penetrating through the base material were produced.

Referring to Table 5, the highest evaluation indicated by symbol ⊚ was obtained in a case where the laser power was 300 (W) and the sweep rate was 150 (mm/sec). The second highest evaluation indicated by symbol ○ was obtained in a case where the laser power was 200 (W) and the sweep rate was 150 (mm/sec), a case where the laser power was 300 (W) and the sweep rate was 100 or 200 (mm/sec), and a case where the laser power was 400 (W) and the sweep rate was 150 (mm/sec). The evaluation indicated by symbol Δ was obtained in a case where the laser power was 200 (W) and the sweep rate was 100 or 200 (mm/sec) and a case where the laser power was 400 (W) and the sweep rate was 100 or 200 (mm/sec).

Considering the above in relation to the area ratio of the weld portion 70 with respect to the non-weld portion 100 viewed in a cross section perpendicular to the longitudinal direction of the tubular crimp portion 30, the following was obtained. In the case of the laser power of 300 (W) and the sweep rate of 150 (mm/sec) for which the highest evaluation indicated by the symbol ⊚, the area ratio was approximately 3. In the cases of the laser power of 200 (W) and the sweep rate of 150 (mm/sec), the laser power of 300 (W) and the sweep rate of 100 or 200 (mm/sec), and the laser power of 400 (W) and the sweep rate of 150 (mm/sec) for which the second highest evaluation of the symbol ○ was obtained, the area ratio was 2.5 or 3.5. Further, in the cases of the laser power of 200 (W) and the sweep rate of 100 or 200 (mm/sec), and the laser power 400 (W) of the sweep rate of 100 or 200 (mm/sec) for which the evaluation of the symbol Δ was obtained, the area ratio was 3.0, 2.0 or 5.0

From the test results mentioned above, similarly to the case of the copper alloy, when laser welding is performed in such a manner that the region of the weld portion 70 has an area ratio of 2 to 5% with respect to the region of the non-weld portion 100 (the normal portion 90 and annealed portion 80, and the plating portion optionally provided on the surface of metal base material thereof) when viewed in a cross section perpendicular to the longitudinal direction of the tubular crimp portion 30, the evaluation was "cracks were produced but only superficially" or better, and it was seen that the cracking during the crimping of the tubular crimp portion 30 (cracks penetrating through the base material) can be prevented.

Further, a sixth example will be described. In the sixth example, a copper alloy FAS-680 (thickness 0.25 mm) manufactured by Furukawa Electric Co., Ltd. was used as the metal base material of the terminal 1. FAS-820 is an alloy having a composition containing approximately 2.3 mass % nickel (Ni), approximately 0.65 mass % silicon (Si), approximately 0.5 mass % zinc (Zn), approximately 0.15 mass % tin (Sn), approximately 0.15 mass % chromium (Cr), and approximately 0.1 mass % magnesium (Mg), and the balance is copper (Cu) and incidental impurities. At least at a part of the metal base material in which the weld portion was constituted using a metal member on which a tin plating was applied was used as a plating portion.

The core wire of the aluminum wire was a wire having a wire size of 0.3 mm. The core wire is an alloy having a composition of approximately 0.2% iron (Fe), approximately 0.2% copper (Cu), approximately 0.1% magnesium (Mg), and approximately 0.04% silicon (Si), and the balance is aluminum (Al) and incidental impurities. This core wire was an electric wire of 11 strand circular compression twisted wire of 0.75 sq (mm$^2$).

The tubular crimp portion 30 of the terminal 1 was formed by laser welding the crimp portion as described above. For the tubular crimp portion 30 formed in this manner, the hardness of each of the weld portion 70 and the normal portion 90 was measured in a cross section perpendicular to a predetermined longitudinal direction of the tubular crimp portion 30, and thereafter, a ratio of the hardness of the normal portion 90 with respect to the hardness of the weld portion 70 was observed. The measurement of the hardness was performed by measuring the Vickers hardness (Hv) by a Vickers test. Note that, the measurement of the Vickers hardness (Hv) of the weld portion was performed at the center position of the weld portion in a cross section perpendicular to a predetermined longitudinal direction of the tubular crimp portion 30, and measurement of the Vickers hardness (Hv) of the normal portion was measured at a position approximately 180 degrees in a peripheral direction from the center position of the weld portion of the normal portion in a cross section perpendicular to the predetermined longitudinal direction of the tubular crimp portion 30 (see FIG. 4). Note that, as a measured value of the Vickers hardness (Hv), measurements were performed ten times for the samples made under the same condition and an average value thereof was rounded off to one decimal place.

The evaluation of the workability was performed using crack appearance after crimping. Specifically, the evaluation was performed by observing the surface and the cross section of the tubular crimp portion with an electron microscope such as an SEM (Scanning Electron Microscope), and categorized using symbol ⊚ which denotes that creases or the like were observed, symbol ○ which denotes that creases were observed but no cracks were produced, symbol Δ which denotes that cracks were produced but only superficially, and symbol x which denotes that cracks penetrating through the base material were produced.

Experiment conditions are as follows:
Laser source used: 500 W CW fiber laser ASF1J233 (wavelength 1,084 nm single-mode oscillation laser light) manufactured by Furukawa Electric Co., Ltd.
Laser light power: 300, 400, 500 W
Sweep rate: 90, 135, 180 mm/sec.
Sweep distance: 9 mm
Laser light irradiation with all conditions focused (spot size: 0.02 mm)
The aforementioned various test results and evaluation results are shown in Table 6.

that creases were observed but no cracks were produced, symbol Δ which denotes that cracks were produced but only superficially, and symbol x which denotes that cracks penetrating through the base material was produced.

Referring to Table 6, the highest evaluation indicated by the symbol ⊚ was obtained in a case where the laser power was 400 (W) and the sweep rate was 135 (mm/sec). The second highest evaluation indicated by the symbol ○ was obtained in a case where the laser power was 300 (W) and the sweep rate was 135 (mm/sec), a case where the laser power was 400 (W) and the sweep rate was 90 or 180 (mm/sec), and a case where the laser power was 500 (W) and the sweep rate was 135 (mm/sec). The evaluation indicated by the symbol Δ was obtained in a case where the laser power was 300 (W) and the sweep rate was 90 or 180 (mm/sec) and a case where the laser power was 500 (W) and the sweep rate was 90 or 180 (mm/sec).

Considering the above in relation to the ratio of the Vickers hardness (Hv) of the normal portion 90 with respect to the Vickers hardness (Hv) of the weld portion 70 viewed in a cross section perpendicular to the predetermined longitudinal direction of the tubular crimp portion 30, the following was obtained. In the case of the laser power of 400 (W) and the sweep rate of 135 (mm/sec) for which the highest evaluation indicated by the symbol ⊚ was obtained, the ratio of the Vickers hardness (Hv) was 2.36. In the case where the laser power of 300 (W) and the sweep rate of 135 (mm/sec), the case where the laser power of 400 (W) and the sweep rate of 90 or 180 (mm/sec), and the laser power of 500 (W) and the sweep rate of 135 (mm/sec) for which the second highest evaluation of the symbol ○ was obtained,

TABLE 6

| | SAMPLE CONDITION | | | EVALUATION RESULT | | |
|---|---|---|---|---|---|---|
| | LASER WELDING CONDITION | | | VICKERS HARDNESS Hv | | |
| | BASE MATERIAL | LASER POWER (W) | SWEEP RATE (mm/sec) | TERMINAL BASE MATERIAL | WELD PORTION | WORKABILITY EVALUATION CRACKING AFTER CRIMPING |
| EXAMPLE | FAS-680 | 300 | 90 | 203 | 89 | Δ |
| | | 400 | | 201 | 83 | ○ |
| | | 500 | | 220 | 82 | Δ |
| | | 300 | 135 | 215 | 94 | ○ |
| | | 400 | | 210 | 89 | ⊚ |
| | | 500 | | 220 | 88 | ○ |
| | | 300 | 180 | 219 | 104 | Δ |
| | | 400 | | 205 | 93 | ○ |
| | | 500 | | 213 | 91 | Δ |
| COMPARATIVE EXAMPLE | FAS-680 | 300 | 200 | 210 | 106 | X |
| | | 500 | 80 | 217 | 77 | X |

Table 6 shows results of measurement of Vickers hardness (Hv) of the normal portion 90 (terminal base material) and the weld portion 70 and observation of cracking after crimping, under various conditions of laser welding. The measurement of the Vickers hardness (Hv) was performed in conformity with JIS Z 2244. In a case where the Vickers hardness (Hv) of the weld portion 70 and of the normal portion 90 are 106 (Hv) and 210 (Hv), respectively, and, a case where they are 77 (Hv) and 217 (Hv), respectively, cracks that penetrate through the base material were produced, and, in cases other than the above, the cracking after crimping was evaluated by the symbol ⊚, the symbol ○ or the symbol Δ. Note that, as has been described above, the workability evaluation was performed by carrying out a cross sectional observation of the cracking after cramping and categorizing using symbol ⊚ which denotes that no creases or the like were observed, symbol ○ which denotes the ratio of the Vickers hardness (Hv) was 2.29, 2.42, 2.20 or 2.50. Further, in the case where the laser power of 300 (W) and the sweep rate of 90 or 180 (mm/sec), and the case where the laser power 500 (W) of the sweep rate of 90 or 180 (mm/sec) for which the evaluation of the symbol Δ was obtained, the ratio of the Vickers hardness (Hv) was 2.28, 2.11, 2.68 or 2.34.

From the test results mentioned above, when laser welding is performed in such a manner that the ratio of the hardness of the region of the normal portion 90 with respect to the hardness of the region of the weld portion 70 is 2.1 to 2.7, the evaluation was "cracks were produced but only superficially" or better, and it was seen that the cracking during crimping of the tubular crimp portion 30 (cracks penetrating through the base material) can be prevented. Further, when the laser welding is performed in such a manner that the ratio of the hardness of the region of the normal portion 90 with respect to the hardness of the region of the weld portion 70 is 2.2 to 2.5, the evaluation was "no creases nor cracks were observed" or "creases were observed but cracks per se were not produced", and it was seen that the cracking during crimping of the tubular crimp portion 30 (cracks penetrating through the base material) can be prevented and also cracks in the superficial layer during the crimping of the tubular crimp portion 30 can be prevented. Further, when the laser welding is performed in such a manner that the ratio of the hardness of the region of the normal portion 90 with respect to the hardness of the region of the weld portion 70 is 2.3 to 2.4, a good result was obtained in which no cracks per se during the crimping of the tubular crimp portion 30 were produced and no creases or the like were observed.

As described above, when forming the tubular crimp portion 30 by laser welding, by performing the welding in such a manner that the ratio of the hardness of the normal portion 90 of the non-weld portion 100 with respect to the weld portion 70 is as described above, it was found that the terminal 1 having the tubular crimp portion 30 of the present disclosure is capable of preventing the cracking during crimping. Note that, as has been described above, the sixth example can be implemented in addition to the first example or separately from the first example.

Next, a seventh example will be described. In the seventh example, an aluminum alloy MSA1 (strip, thickness 0.25 mm) manufactured by Furukawa Electric Co., Ltd was used as the metal base material of the terminal 1. MSA1 is an alloy having a composition containing approximately 0.2% iron (Fe), approximately 0.2% copper (Cu), approximately 0.1% magnesium (Mg), approximately 0.04% silicon (Si), and the balance is aluminum (Al) and incidental impurities. At least at a part of the metal base material in which the weld portion was formed, a metal member on which a tin plating was applied was used as a plating portion.

The formation of the core wire of the aluminum wire and the tubular crimp portion 30 of the terminal 1 is similar to the case of the aforementioned copper alloy. Also, the area ratio of the weld portion 70 with respect to the region of the non-weld portion 100 (the normal portion 90 and annealed portion 80, and the plating portion optionally provided on the surface of the metal base material thereof) when seen in a cross section perpendicular to the longitudinal direction of the tubular crimp portion 30 was identified in the similar manner to the case for the copper alloy described above.

Similarly to the above, evaluation of the workability was performed using crack appearance after crimping. Evaluation was made by observing the surface and the cross section of the tubular crimp portion with an electron microscope such as the SEM (Scanning Electron Microscope), and categorizing using symbol ⊚ which denotes that no creases or the like were observed, symbol ○ which denotes that creases were observed but no cracks were produced, symbol Δ which denotes that cracks were produced but only superficially, and symbol x which denotes that cracks penetrating through the base material.

Experiment conditions are as follows:

Laser source used: 500 W CW fiber laser ASF1J233 (wavelength 1,084 nm single-mode oscillation laser light) manufactured by Furukawa Electric Co., Ltd.

Laser light power: 200, 300, 400 W

Sweep rate: 100, 150, 200 mm/sec.

Sweep distance: 9 mm

Laser light irradiation with all conditions focused (spot size: 0.02 mm)

The aforementioned various test results and evaluation results are shown in Table 7.

TABLE 7

| | SAMPLE CONDITION | | | EVALUATION RESULT | | |
|---|---|---|---|---|---|---|
| | | LASER WELDING CONDITION | | VICKERS HARDNESS Hv | | |
| | BASE MATERIAL | LASER POWER (W) | SWEEP RATE (mm/sec) | TERMINAL BASE MATERIAL | WELD PORTION | WORKABILITY EVALUATION CRACKING AFTER CRIMPING |
| EXAMPLE | MSA1 | 200 | 100 | 82 | 36 | Δ |
| | | 300 | | 81 | 33 | ○ |
| | | 400 | | 88 | 33 | Δ |
| | | 200 | 150 | 85 | 38 | ○ |
| | | 300 | | 88 | 38 | ⊚ |
| | | 400 | | 90 | 36 | ○ |
| | | 200 | 200 | 83 | 39 | Δ |
| | | 300 | | 88 | 40 | ○ |
| | | 400 | | 86 | 37 | Δ |
| COMPARATIVE EXAMPLE | MSA1 | 200 | 220 | 83 | 43 | X |
| | | 400 | 80 | 81 | 28 | X |

Table 7 shows results of measurement of Vickers hardness (Hv) of the normal portion 90 (terminal base material) and the weld portion 70 and observation of cracking after crimping, under various conditions of laser welding. The measurement of the Vickers hardness (Hv) was performed in conformity with JIS Z 2244. In a case where the Vickers hardness (Hv) of the weld portion 70 and the normal portion 90 are 43 (Hv) and 83 (Hv), respectively, and, a case where these are 28 (Hv) and 81 (Hv), respectively, cracks that penetrate through the base material were produced, and, in cases other than the above, the cracking after crimping was evaluated by symbol ⊚, symbol ○ or symbol Δ. Note that, as has been described above, the workability evaluation was performed by carrying out a cross sectional observation of the cracking after cramping and categorizing using symbol ⊚ which denotes that no creases or the like were observed, symbol ○ which denotes that creases were observed but no cracks were produced, symbol Δ which denotes that cracks were produced but only superficially, and symbol x which denotes that cracks penetrating through the base material were produced.

Referring to Table 7, the highest evaluation indicated by the symbol ⊚ was obtained in a case where the laser power was 300 (W) and the sweep rate was 150 (mm/sec). The second highest evaluation indicated by the symbol ○ was obtained in a case where the laser power was 200 (W) and the sweep rate was 150 (mm/sec), a case where the laser power was 300 (W) and the sweep rate was 100 or 200 (mm/sec), and a case where the laser power was 400 (W) and the sweep rate was 150 (mm/sec). The evaluation indicated by the symbol Δ was obtained in a case where the laser power was 200 (W) and the sweep rate was 100 or 200 (mm/sec) and a case where the laser power was 400 (W) and the sweep rate was 100 or 200 (mm/sec).

Considering the above in relation to the ratio the Vickers hardness (Hv) of the normal portion 90 with respect to the Vickers hardness (Hv) of the weld portion 70 viewed in a cross section perpendicular to the predetermined longitudinal direction of the tubular crimp portion 30, the following was obtained. In the case of the laser power of 300 (W) and the sweep rate of 150 (mm/sec) for which the highest evaluation indicated by the symbol ⊚ was obtained, the ratio of the Vickers hardness (Hv) was 2.32. In the cases of the laser power of 200 (W) and the sweep rate of 150 (mm/sec), the laser power of 300 (W) and the sweep rate of 100 or 200 (mm/sec), and the laser power of 400 (W) and the sweep rate of 150 (mm/sec) for which the second highest evaluation of the symbol ○ was obtained, the ratio of the Vickers hardness (Hv) was 2.24, 2.45, 2.20 or 2.50. Further, in the cases of the laser power of 200 (W) and the sweep rate of 100 or 200 (mm/sec), and the laser power 400 (W) of the sweep rate of 100 or 200 (mm/sec) which received the evaluation of the symbol Δ, the ratio of the Vickers hardness (Hv) was 2.28, 2.13, 2.67 or 2.32.

From the test results mentioned above, similarly to the case of the copper alloy, when laser welding is performed in such a manner that the ratio of the hardness of the region of the normal portion 90 with respect to the hardness of the region of the weld portion 70 is 2.1 to 2.7, the evaluation was "cracks were produced but only superficially" or better, and it was seen that the cracking during crimping of the tubular crimp portion 30 (cracks penetrating through the base material) can be prevented. Further, when the laser welding is performed in such a manner that the ratio of the hardness of the region of the normal portion 90 with respect to the hardness of the region of the weld portion 70 is 2.2 to 2.5, the evaluation was "no creases nor cracks were observed" or "creases were observed but no cracks per se were produced", and it was seen that the cracking during crimping of the tubular crimp portion 30 (cracks penetrating through the base material) can be prevented and also cracks in the superficial layer during the crimping of the tubular crimp portion 30 can be prevented. Further, when the laser welding is performed in such a manner that the ratio of the hardness of the region of the normal portion 90 with respect to the hardness of the region of the weld portion 70 is 2.3 to 2.4, a good result was obtained in which cracks per se during the crimping of the tubular crimp portion 30 were not produced and no creases or the like were observed.

As described above, when forming the tubular crimp portion 30 by laser welding, by performing the welding in such a manner that the ratio of the hardness of the normal portion 90 of the non-weld portion 100 with respect to the weld portion 70 is as described above, it was found that the terminal 1 having the tubular crimp portion 30 of the present disclosure is capable of preventing the cracking during crimping. Note that, the seventh example can be implemented in addition to the third example or separately from the third example.

What is claimed is:

1. A terminal comprising a tubular crimp portion that crimp connects with an electric wire, the tubular crimp portion being composed of a metal member,
the tubular crimp portion including a non-weld portion and a weld portion, the weld portion being formed by laser welding,
wherein a metal base material constituting the metal member of the non-weld portion includes an annealed portion, and
an area of the annealed portion located on a cross section perpendicular to a longitudinal direction of the tubular crimp portion, the area of the annealed portion being 5 to 60% of an area of the weld portion and the non-weld portion.

2. The terminal according to claim 1, wherein the non-weld portion includes a non-annealed portion in addition to the annealed portion, and the annealed portion has a hardness of 70 to 90% of the non-annealed portion.

3. The terminal according to claim 1, wherein, in a cross section perpendicular to a longitudinal direction of the tubular crimp portion, an area of the weld portion is 2 to 5% of an area of the non-weld portion.

4. The terminal according to claim 1, wherein the non-weld portion includes a non-annealed portion in addition to the annealed portion, and a ratio of a hardness of the non-annealed portion with respect to a hardness of the weld portion is 2.1 to 2.7.

5. The terminal according to claim 1, wherein the metal base material is made of one of copper and a copper alloy.

6. The terminal according to claim 1, wherein the metal base material is made of one of aluminum and an aluminum alloy.

7. A method of manufacturing a terminal having a tubular crimp portion that crimp connects with an electric wire, comprising:
forming a crimp portion having a C-shape in a cross section perpendicular to a longitudinal direction of the tubular crimp portion by bending a metal member; and
forming the tubular crimp portion by laser welding both ends of the crimp portion,
wherein, by the welding, a weld portion is formed in the tubular crimp portion, and an annealed portion is formed in a non-weld portion, and
in an area of the annealed portion located on a cross section perpendicular to a longitudinal direction of the tubular crimp portion, the area of the annealed portion being 5 to 60% of an area of the weld portion and the non-weld portion.

8. The method of manufacturing a terminal according to claim 7, wherein the non-weld portion includes a non-annealed portion in addition to the annealed portion, and the annealed portion has a hardness of 70 to 90% of a hardness of the non-annealed portion.

9. The method of manufacturing a terminal according to claim 7, wherein a tubular crimp portion is formed by welding such that, in a cross section perpendicular to a longitudinal direction of the tubular crimp portion, an area of the weld portion is 2 to 5% of an area of the non-weld portion.

10. The method of manufacturing a terminal according to claim 7, wherein non-weld portion includes a non-annealed portion in addition to the annealed portion, and the tubular crimp portion is formed by welding such that, a ratio of the hardness of the non-annealed portion with respect to the hardness of the weld portion is 2.1 to 2.7.

11. The method of manufacturing a terminal according to claim 7, wherein a metal base material constituting the metal member is made of one of copper and a copper alloy.

12. The method of manufacturing a terminal according to claim 7, wherein a metal base material constituting the metal member is made of one of aluminum and an aluminum alloy.

13. A termination connection structure of an electric wire comprising a configuration in which a terminal and an electric wire are crimp connected at the tubular crimp portion of the terminal,

- the terminal including a tubular crimp portion that crimp connects with an electric wire,
- the tubular crimp portion being composed of a metal member,
- the tubular crimp portion including a non-weld portion and a weld portion, the weld portion being formed by laser welding,
- wherein a metal base material constituting the metal member of the non-weld portion includes an annealed portion, and
- in an area of the annealed portion located on a cross section perpendicular to a longitudinal direction of the tubular crimp portion, the area of the annealed portion being 5 to 60% of an area of the weld portion and the non-weld portion.

14. The termination connection structure of an electric wire according to claim 13, wherein the electric wire is made of one of aluminum and an aluminum alloy.

* * * * *